US012435793B2

(12) United States Patent
Cao

(10) Patent No.: US 12,435,793 B2
(45) Date of Patent: Oct. 7, 2025

(54) CRYOGENIC FLUID SHUT-OFF VALVE

(71) Applicant: Engineered Controls International, LLC, Elon, NC (US)

(72) Inventor: Guangbin Cao, Shanghai (CN)

(73) Assignee: Engineered Controls International, LLC, Elon, NC (US)

( * ) Notice: Subject to any disclaimer, the term of this patent is extended or adjusted under 35 U.S.C. 154(b) by 114 days.

(21) Appl. No.: 18/550,961

(22) PCT Filed: Nov. 17, 2021

(86) PCT No.: PCT/CN2021/131141
§ 371 (c)(1),
(2) Date: Sep. 16, 2023

(87) PCT Pub. No.: WO2022/199057
PCT Pub. Date: Sep. 29, 2022

(65) Prior Publication Data
US 2024/0142000 A1    May 2, 2024

(30) Foreign Application Priority Data
Mar. 23, 2021    (WO) ............... PCT/CN2021/082371

(51) Int. Cl.
*F16K 1/02*    (2006.01)
*F16K 1/48*    (2006.01)
(Continued)

(52) U.S. Cl.
CPC ............... *F16K 1/02* (2013.01); *F16K 1/48* (2013.01); *F16K 27/02* (2013.01); *F16K 31/508* (2013.01); *F16K 41/106* (2013.01)

(58) Field of Classification Search
CPC ...... F16K 41/023; F16K 41/026; F16K 41/04; F16K 41/043; F16K 41/046; F16K 41/08;
(Continued)

(56) References Cited

U.S. PATENT DOCUMENTS 2,691,773 A    10/1954    Lichtenberger
3,554,569 A *    1/1971    Gorman ............... F16J 15/3236
277/620
(Continued)

FOREIGN PATENT DOCUMENTS

CN    101334116    12/2008
CN    201636340    11/2010
(Continued)

OTHER PUBLICATIONS

Partial European Search Report for European Patent Application No. 24205404.7 dated Dec. 18, 2024, 15 pp.
(Continued)

*Primary Examiner* — Michael R Reid
(74) *Attorney, Agent, or Firm* — Neal, Gerber & Eisenberg LLP

(57) ABSTRACT

Shut-off valves for cryogenic fluids are disclosed herein. An example valve includes a valve body defining a flow path and a valve seat, a bonnet coupled to the valve body and defining a bonnet chamber, a plug, and a stem coupled to the plug. The stem is configured to slide to cause the plug to slide. The valve includes a spindle that includes external threads. The spindle is configured to move along a longitudinal axis of the bonnet as the spindle is rotated about the longitudinal axis via the external threads to cause the stem to slide linearly along the longitudinal axis. The valve includes a pivot ball positioned between and operatively coupled to the stem and the spindle. The pivot ball is configured to translate linear and rotational movement of the spindle into linear movement of the stem and the plug.

19 Claims, 32 Drawing Sheets

(51) Int. Cl.
*F16K 27/02* (2006.01)
*F16K 31/50* (2006.01)
*F16K 41/10* (2006.01)

(58) Field of Classification Search
CPC ... F16K 41/083; F16K 41/06–066; F16K 1/02
See application file for complete search history.

(56) References Cited

U.S. PATENT DOCUMENTS

| | | | |
|---|---|---|---|
| 4,553,759 A | * | 11/1985 | Kilmoyer ............... F16J 15/164 277/529 |
| 5,158,106 A | | 10/1992 | McIntosh |
| 6,302,374 B1 | | 10/2001 | Fink |
| 11,655,898 B2 | | 5/2023 | Hosokawa et al. |
| 2018/0299055 A1 | | 10/2018 | Thomas et al. |

FOREIGN PATENT DOCUMENTS

| | | |
|---|---|---|
| CN | 203272811 | 11/2013 |
| CN | 203413129 | 1/2014 |
| CN | 203500516 | 3/2014 |
| CN | 203868362 | 10/2014 |
| CN | 206112119 | 4/2017 |
| CN | 207018543 | 2/2018 |
| CN | 209262336 | 8/2019 |
| CN | 111022654 | 4/2020 |
| CN | 210461708 | 5/2020 |
| CN | 211901626 | 11/2020 |
| CN | 212360823 | 1/2021 |
| JP | 2017096422 | 6/2017 |
| JP | 2019116901 | 7/2019 |
| WO | WO2020091037 | 5/2020 |

OTHER PUBLICATIONS

Partial European Search Report for European Patent Application No. 21932665.9 dated Jan. 15, 2025, 17 pp.
International Search Report and Written Opinion for PCT/CN2021/082371 dated Dec. 2, 2021, 10 pp.
International Search Report and Written Opinion for PCT/CN2021/131141 dated Feb. 10, 2022, 9 pp.

* cited by examiner

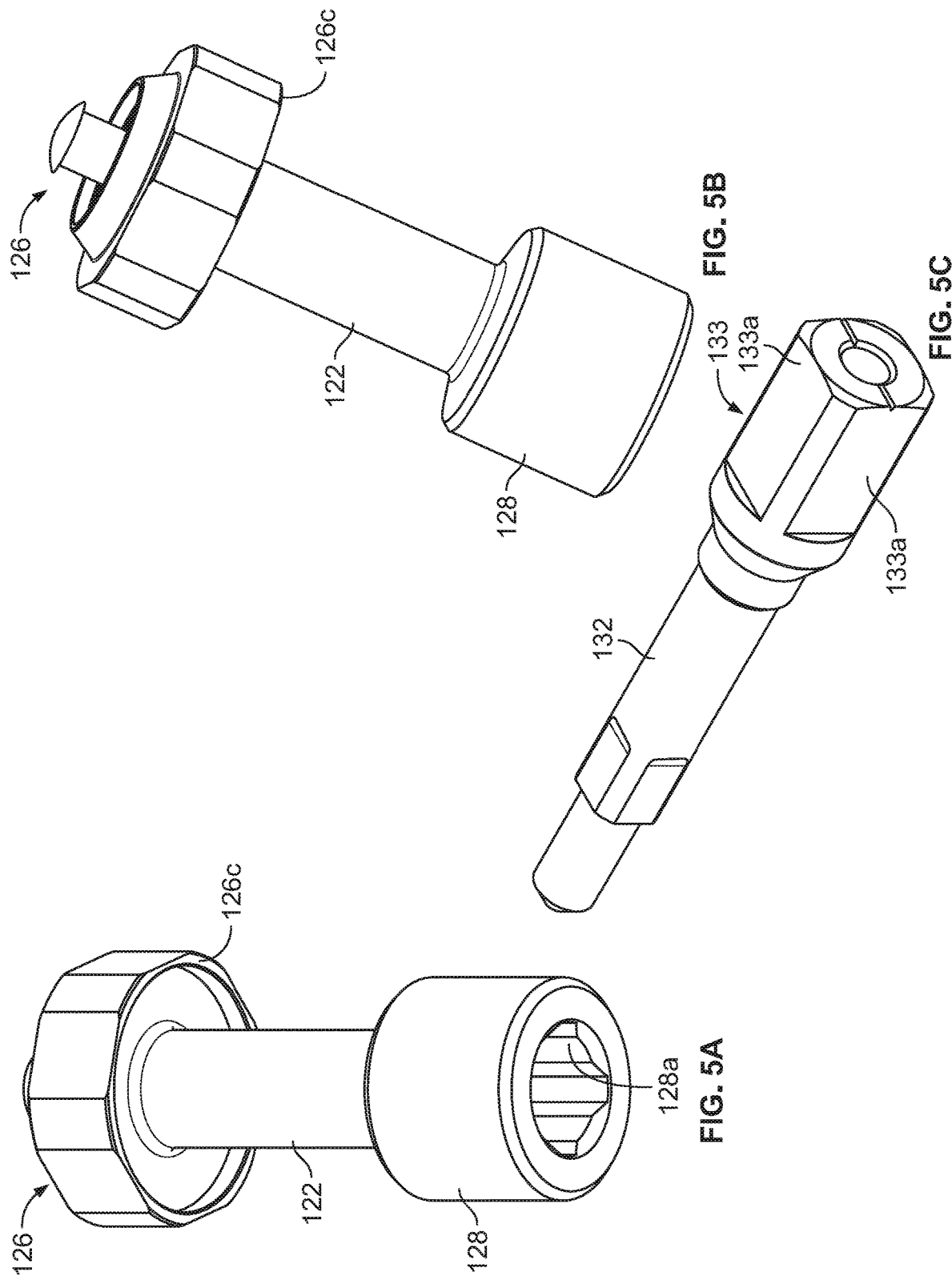

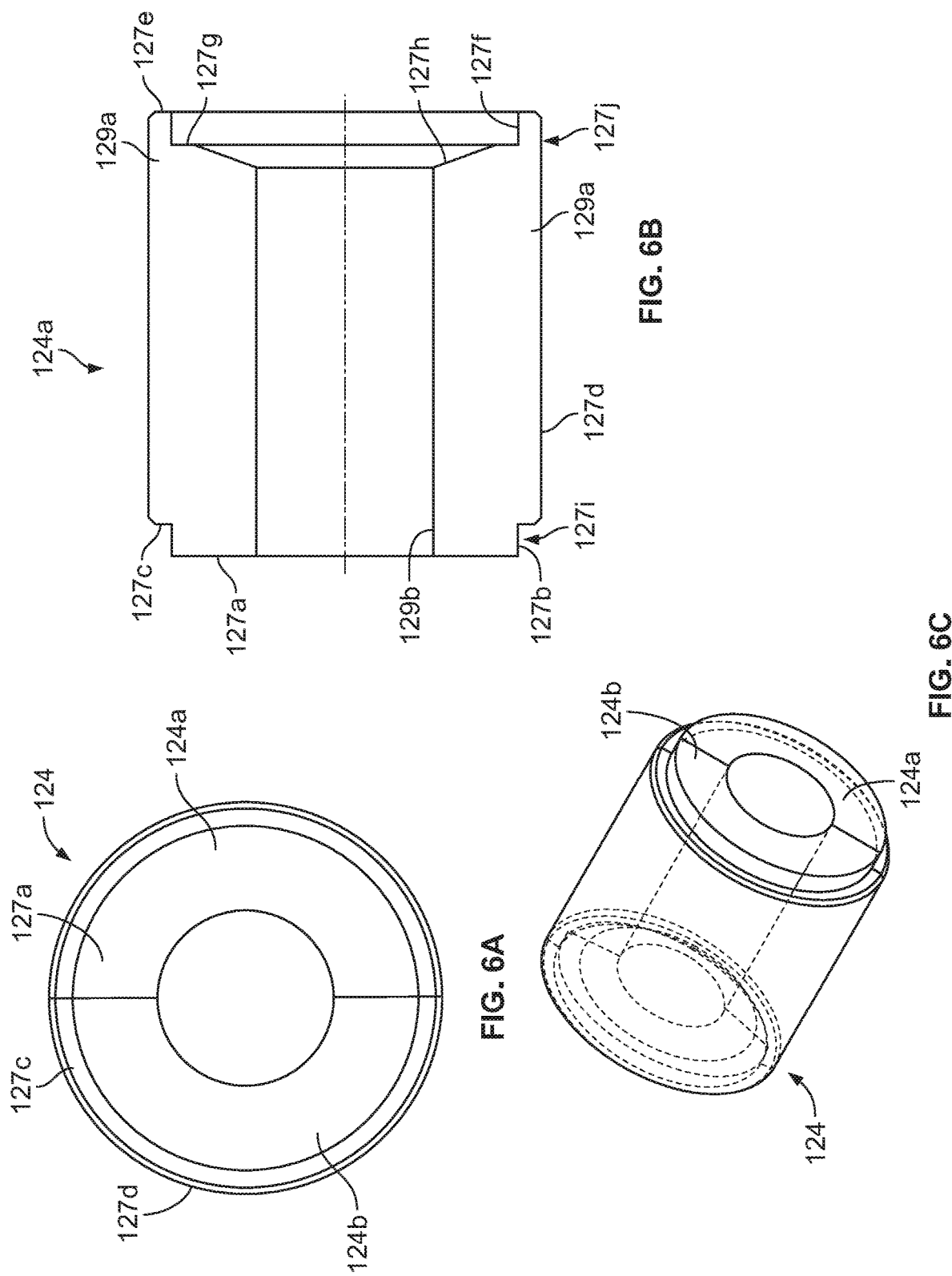

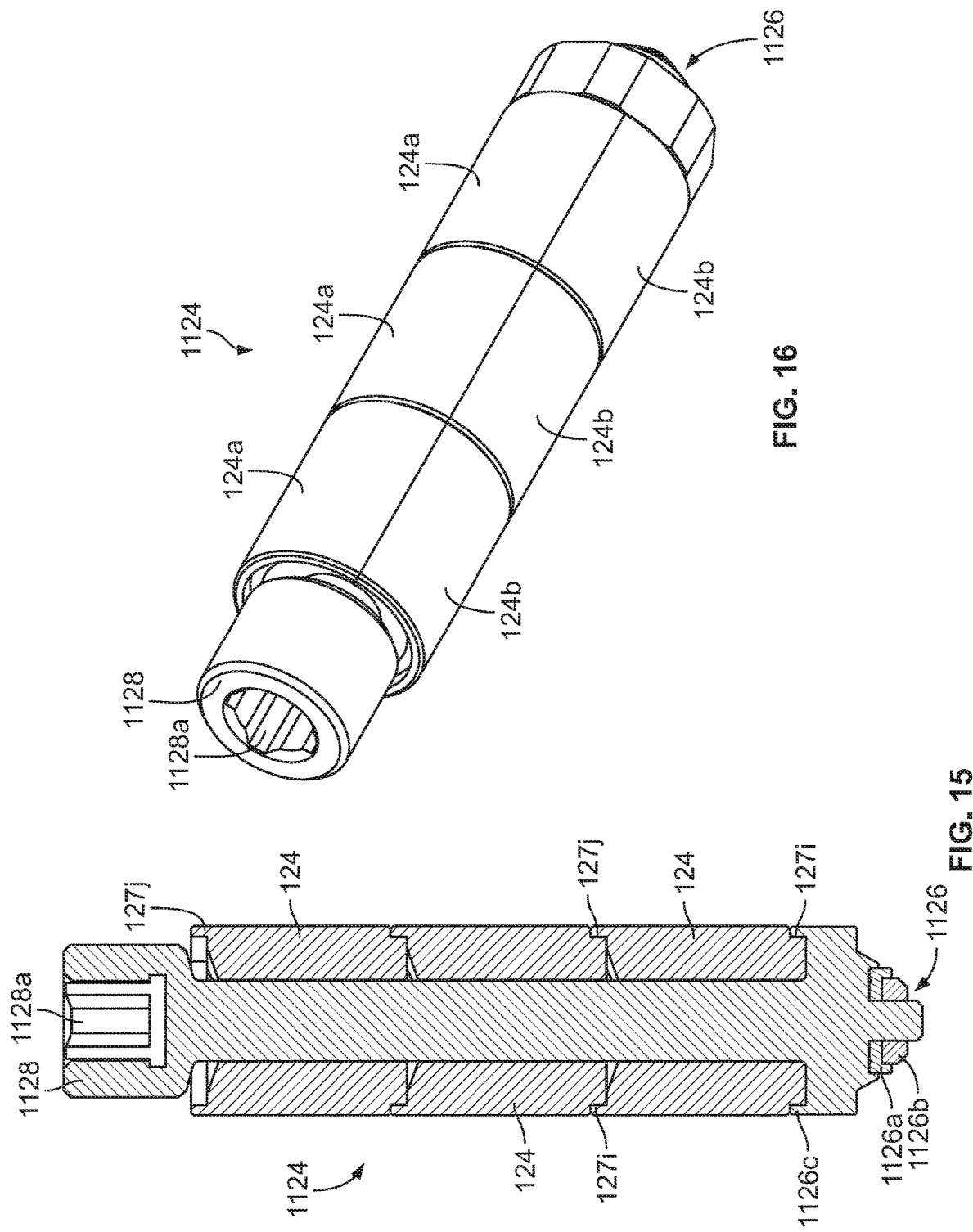

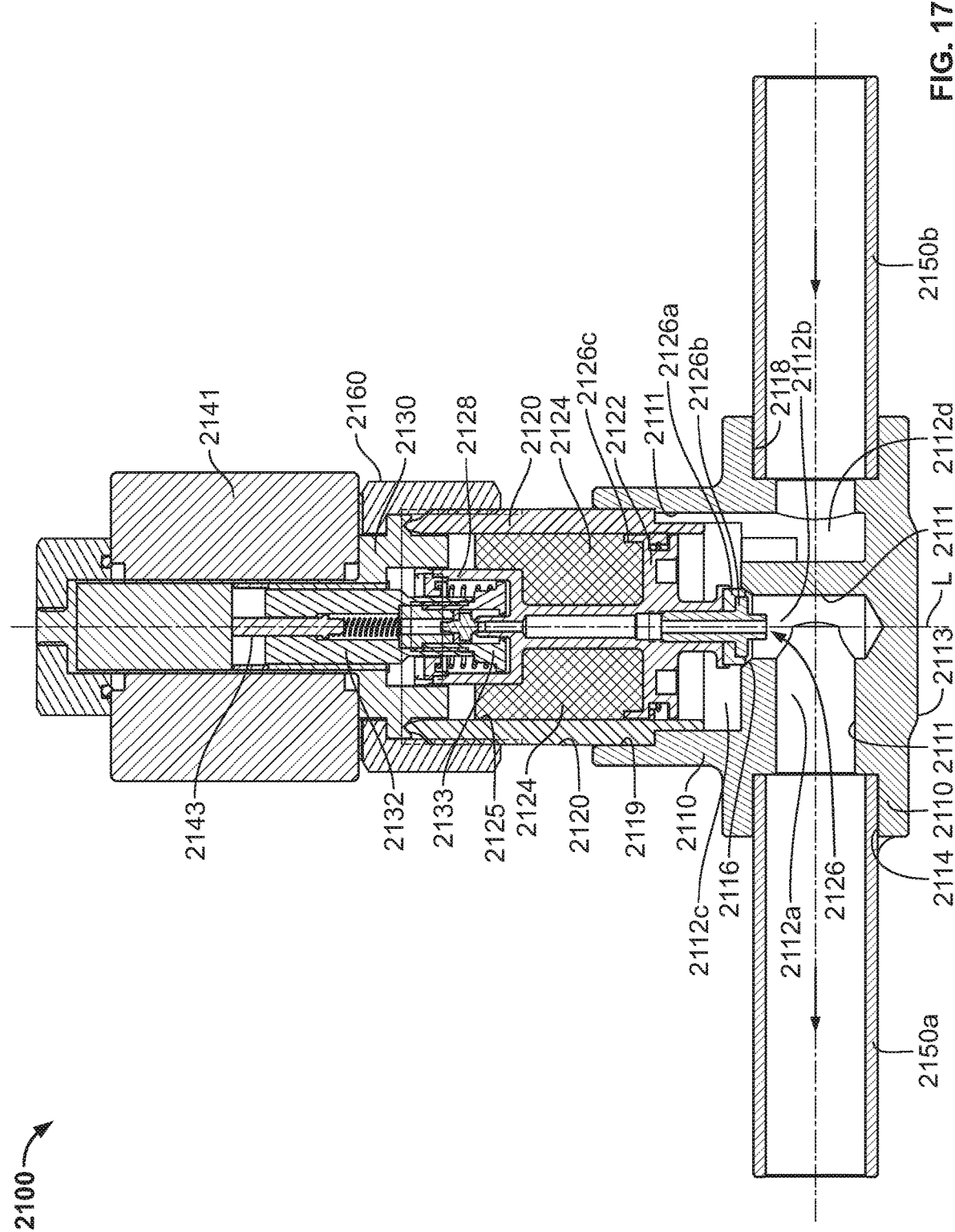

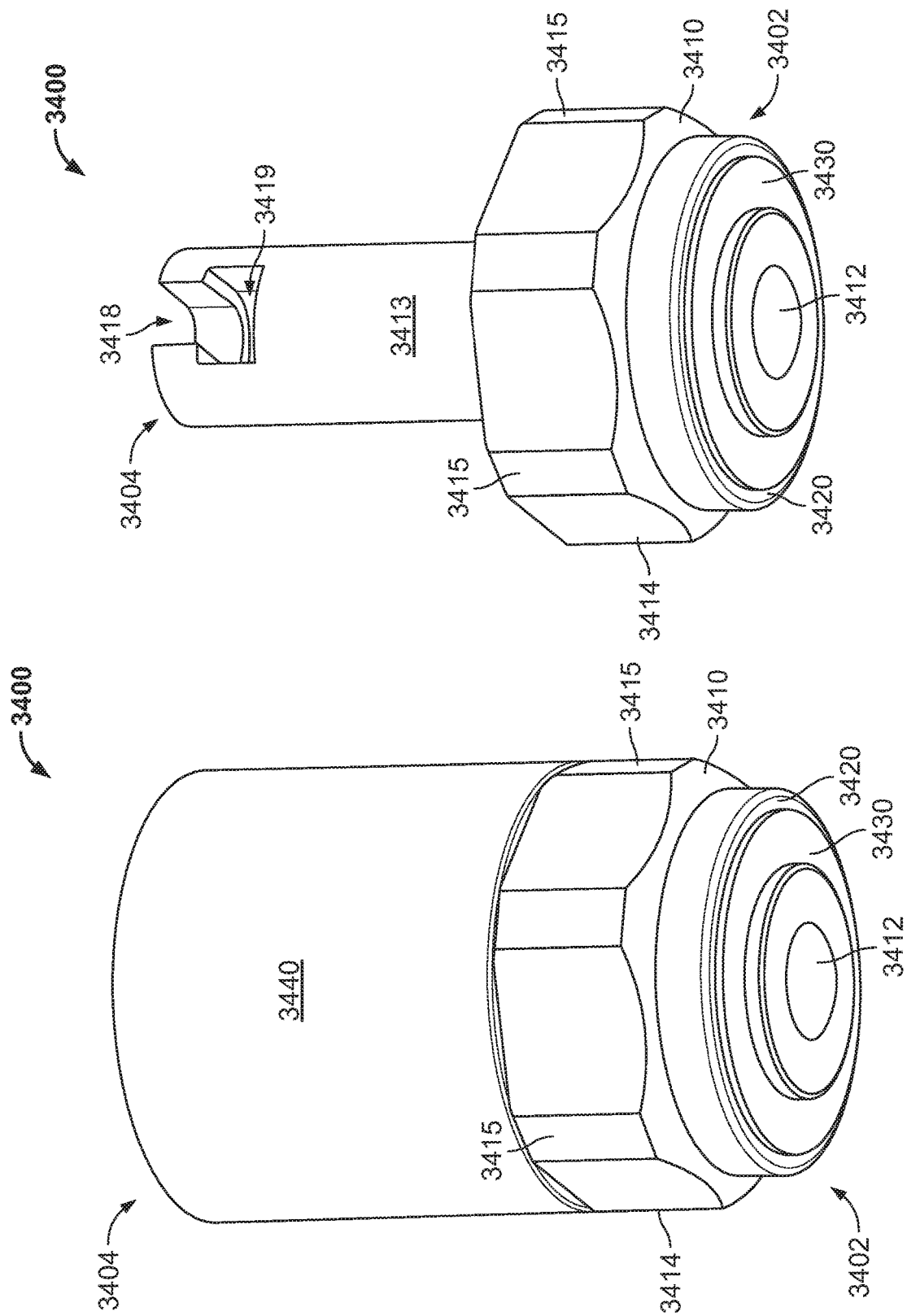

CRYOGENIC FLUID SHUT-OFF VALVE

CROSS-REFERENCE

This application is a national-stage entry of International Patent Application No. PCT/CN2021/131141 filed on Nov. 17, 2021, which claims priority to International Application No. PCT/CN2021/082371, filed on Mar. 23, 2021, both of which are incorporated herein by reference in their entirety.

TECHNICAL FIELD

This disclosure generally relates to a shut-off valve for controlling the flow of cryogenic fluid from a pressurized fluid receptacle (e.g., a tank, cylinder, or conduit).

BACKGROUND

Cryogenic fluid shut-off valves divert or otherwise close off the flow of a pressurized fluid from a pressurized fluid receptacle (e.g., tank or cylinder). Closing off or diverting the fluid flow from the pressurized fluid receptacle is desirable to control transport of the pressurized fluid to a desired location. For example, a pressurized fluid tank or cylinder may hold a fluid such as liquefied hydrogen (LH2), liquefied helium, liquefied carbon dioxide (CO2), liquefied nitrogen, liquefied natural gas, and other such gases and fluids. The pressurized fluid tank or cylinder may be configured to supply or otherwise generate a flow of pressurized fluid or pressurized gas through a pressurized fluid conduit. A shut-off valve enables the fluid flowing through the conduit to be cut off or diverted when a problem is detected or pressurized fluid demand changes.

A cryogenic shut-off valve may be connected to and in fluid communication with the pressurized fluid tank or cylinder. The cryogenic shut-off valve may be configured to withstand the extreme operating conditions associated with cryogenic fluid handling, particularly for extremely cold fluids such as liquid helium, liquid hydrogen and liquid carbon dioxide, to reliably cut off or divert the pressurized fluid flow as needed.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

The present disclosure relates to a shut-off valve for use with cryogenic fluid systems, as described and taught herein.

In one embodiment, a shut-off valve for use with cryogenic fluid is provided, the shut-off valve comprising: a valve body defining a flow path, an inlet of the flow path, an outlet of the flow path, and a valve seat located along the flow path between the inlet and the outlet; a bonnet coupled to the valve body and defining a bonnet chamber that extends along a longitudinal axis of the bonnet and connects to the flow path; a plug configured to slide along the longitudinal axis of the bonnet between a closed position at which the plug sealingly engages the valve seat and an open position at which the plug is disengaged from the valve seat; a stem coupled to the plug and housed within the bonnet chamber of the bonnet, wherein the stem is configured to slide along the longitudinal axis of the bonnet to cause the plug to slide between the open position and the closed position; a spindle comprising external threads and operatively coupled to the stem, wherein the spindle is configured to move along the longitudinal axis of the bonnet as the spindle is rotated via the external threads about the longitudinal axis to cause the stem to slide linearly along the longitudinal axis; and a pivot ball positioned between and operatively coupled to the stem and the spindle, wherein the pivot ball is configured to translate linear and rotational movement of the spindle into linear movement of the stem and the plug.

BRIEF DESCRIPTION OF THE DRAWINGS

FIGS. 5A and 5B are perspective views of the lower spindle of the cryogenic fluid shut-off valve of FIG. 1.

FIG. 5C is a perspective view of the upper spindle of the cryogenic fluid shut-off valve of FIG. 1.

FIG. 6A is a bottom view of the buffer of the cryogenic fluid shut-off valve of FIG. 1.

FIG. 6B is an elevational view of one of the buffer portions of the buffer of FIG. 1.

FIG. 6C is a perspective view of the buffer of FIG. 1.

FIG. 15 is a cross-sectional view of the lower spindle and buffer of the cryogenic fluid shut-off valve of FIG. 11.

FIG. 16 is a perspective view showing the lower spindle and buffer of the cryogenic fluid shut-off valve of FIG. 11.

FIG. 17 is a cross-sectional view of a cryogenic fluid shut-off valve coupled to a fluid conduit and a solenoid actuator for actuation of the cryogenic fluid shut-off valve and showing the shut-off valve in the closed position.

FIG. 22 is a perspective view of a plug of the cryogenic fluid shut-off valve of FIG. 20.

FIG. 23 is a perspective view of the plug of FIG. 22 without a buffer.

DETAILED DESCRIPTION

Figure 1:
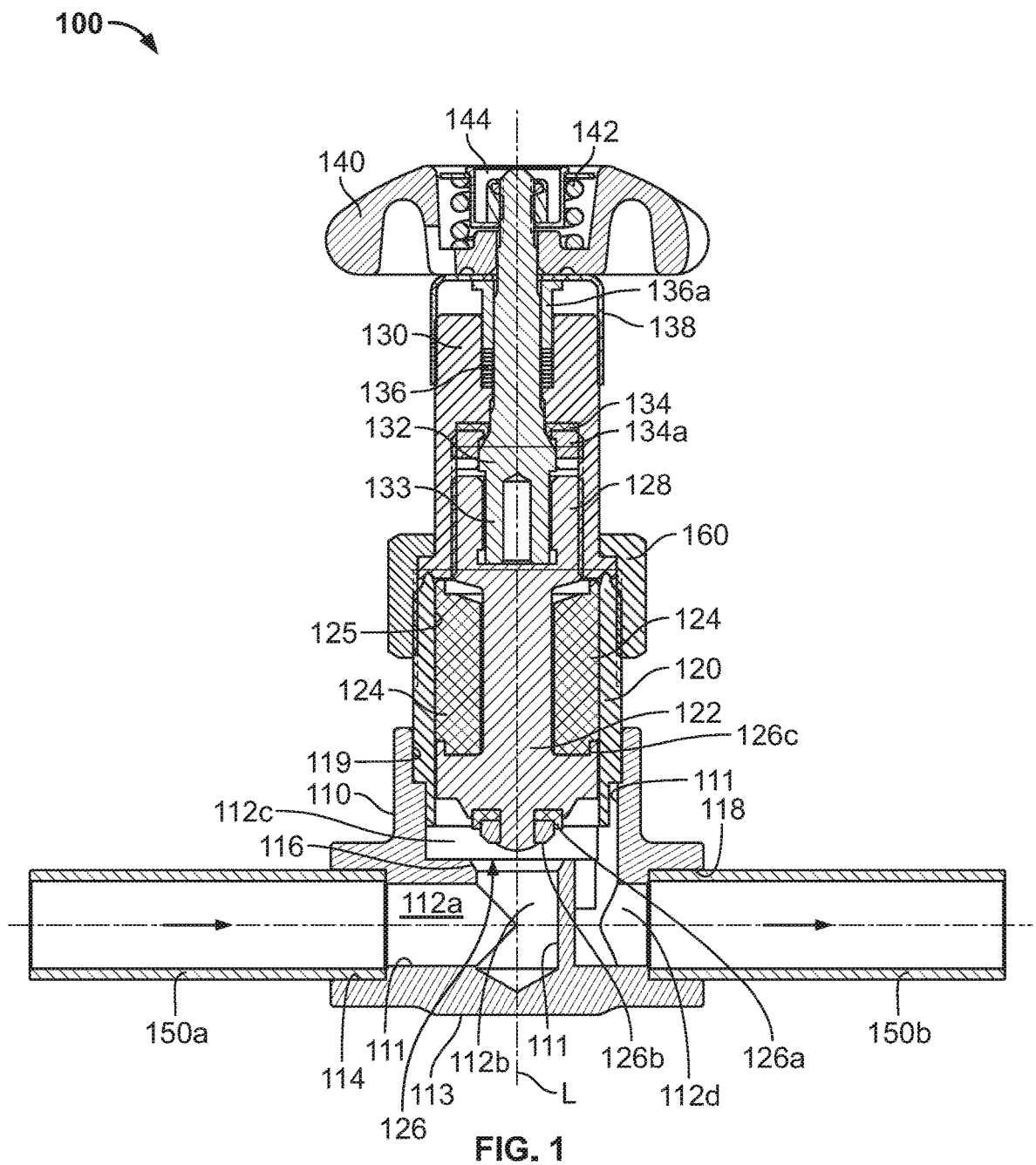
FIG. 1 is a cross-sectional view of a cryogenic fluid shut-off valve coupled to a fluid conduit and showing the shut-off valve in an open position.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

FIGS. 1-7B and 13 illustrate an exemplary cryogenic fluid shut-off valve 100. The cryogenic fluid shut-off valve 100 (sometimes referred to herein as valve 100 for brevity) includes a body 110, a valve tube 120 connected to the body 110, a valve stem 130 connected to the valve tube 120, and a valve actuating member 140. In the illustrated example, the valve 100 has a longitudinal axis L and the body 110, valve tube 120, valve stem 130, and valve actuating member 140 are aligned with one another along longitudinal axis L. In the illustrated example, the body 110, valve tube 120, and valve stem 130 can be formed out of austenitic stainless steel or other such material capable of withstanding extreme operating temperatures (e.g., −270° C. to +85° C.).

As best shown in FIGS. 1 to 4, the body 110 includes a plurality of inner surfaces 111 that may be parallel, perpendicular, and/or sloped with respect to longitudinal axis L. The plurality of inner surfaces 111 define a plurality of voids or passages 112 within the body 110. The body 110 also includes multiple outer surfaces 113 that may be parallel, perpendicular, and/or sloped with respect to longitudinal axis L.

In the illustrated example, a cylindrical inlet passage 112a (i.e., a first passage) is defined by one or more of the inner surfaces 111 of the body 110. At least a portion of the inner surfaces 111 that define inlet passage 112a may define an inlet conduit receiving portion 114 that receives an inlet fluid conduit 150a coupled to the body 110 of valve 100. In various embodiments, the inlet fluid conduit 150a extends into the inlet conduit receiving portion 114 and is connected to or otherwise fixedly attached to the one or more outer surfaces 113 of the body 110. In the illustrated example, the inlet fluid conduit 150a is connected to the body 110 via a weld, however other attachment methods such as an interference fit, bonding, and the like are possible. In various other embodiments, a portion of the inner surfaces 111 that define the inlet conduit receiving portion 114 are a threaded surface (not shown). In such embodiments, the inlet fluid conduit 150a includes corresponding threads that are threaded into the inlet conduit receiving portion 114 of inlet passage 112a.

In the illustrated example, one or more of the inner surfaces 111 further define a first cylindrical void 112b and a second cylindrical void 112c within body 110. The first and second cylindrical voids 112b, 112c are in fluid communication with one another and aligned along longitudinal axis L. In the illustrated example, the first cylindrical void 112b has a first diameter that is smaller than a second diameter of the second cylindrical void 112c; other sizes and configurations of the first and second cylindrical voids 112b, 112c are possible. Furthermore, the inner surfaces 111 also define a valve seat 116 disposed between the first and second cylindrical voids 112b, 112c of body 110.

In the illustrated example, one or more of the inner surfaces 111 further define a cylindrical outlet passage 112d (i.e., second passage) of body 110. At least a portion of the inner surfaces 111 that define outlet passage 112d, may define an outlet conduit receiving portion 118 that receives an outlet fluid conduit 150b. In various embodiments, the outlet fluid conduit 150b extends into the outlet conduit receiving portion 118 and is connected to or otherwise fixedly attached to the one or more outer surfaces 113 of the body 110. In the illustrated example, the, outlet fluid conduit 150b is connected to the body 110 via a weld, however other attachment methods such as an interference fit, bonding, and the like are possible. In various other embodiments, a portion of the inner surfaces 111 that define the outlet conduit receiving portion 118 are a threaded surface (not shown). In such embodiments, the outlet fluid conduit 150b includes corresponding threads that are threaded into the outlet conduit receiving portion 118 of the outlet passage 112d.

In the illustrated example, inlet passage 112a is in fluid communication with void 112b, void 112c is in fluid communication with void 112b, and outlet passage 112d is in fluid communication with void 112c. Thus, inlet passage 112a, void 112b, void 112c, and outlet passage 112d collectively define a fluid pathway through the body 110 of valve 100. As such, during operation, valve 100 can be selectively actuated (i.e., opened and closed) to control the flow of cryogenic fluid through the fluid pathway.

Figure 1A:
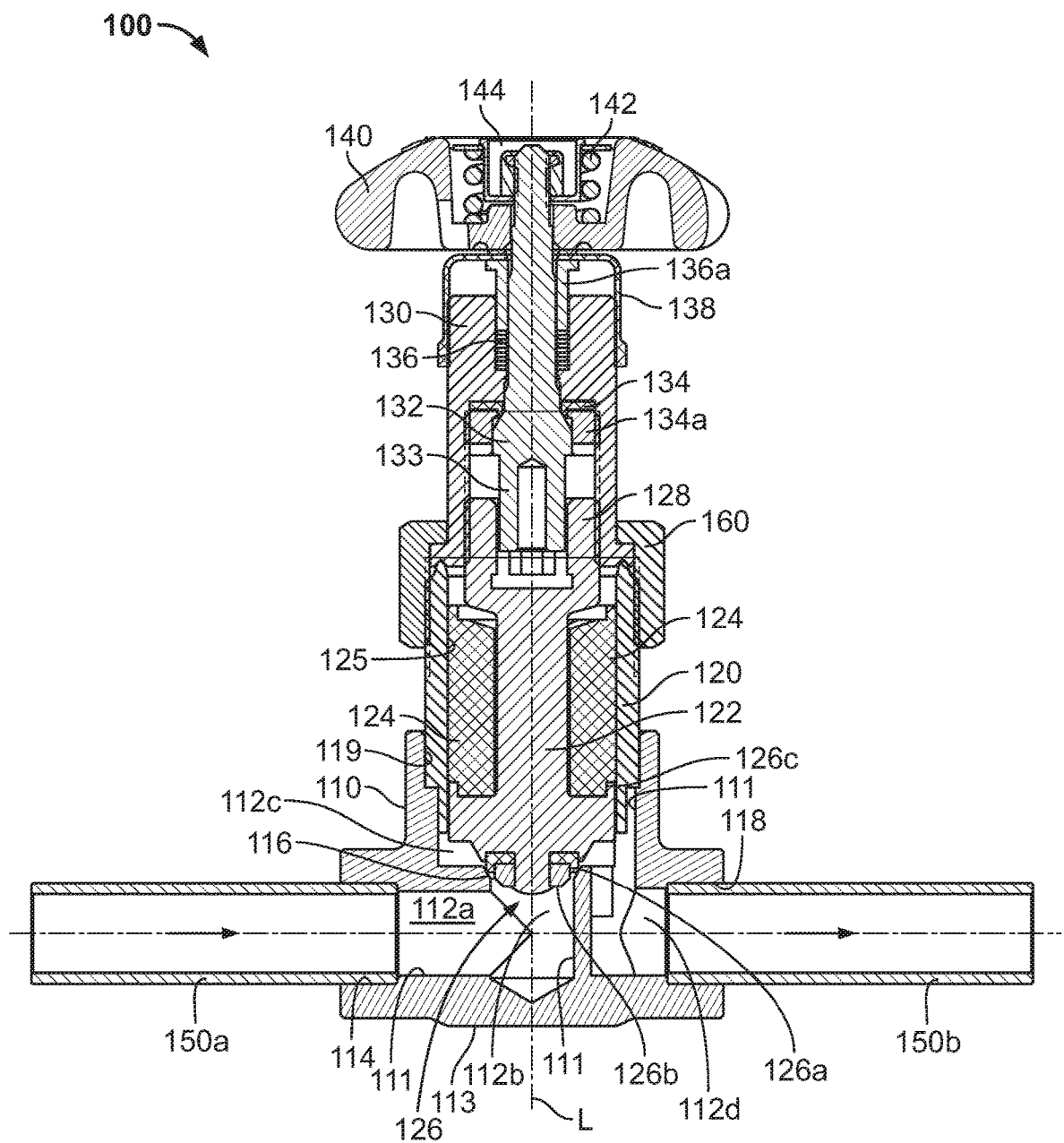
FIG. 1A is a cross-sectional view of the cryogenic fluid shut-off valve of FIG. 1 showing the shut-off valve in a closed position.
Figure 2:
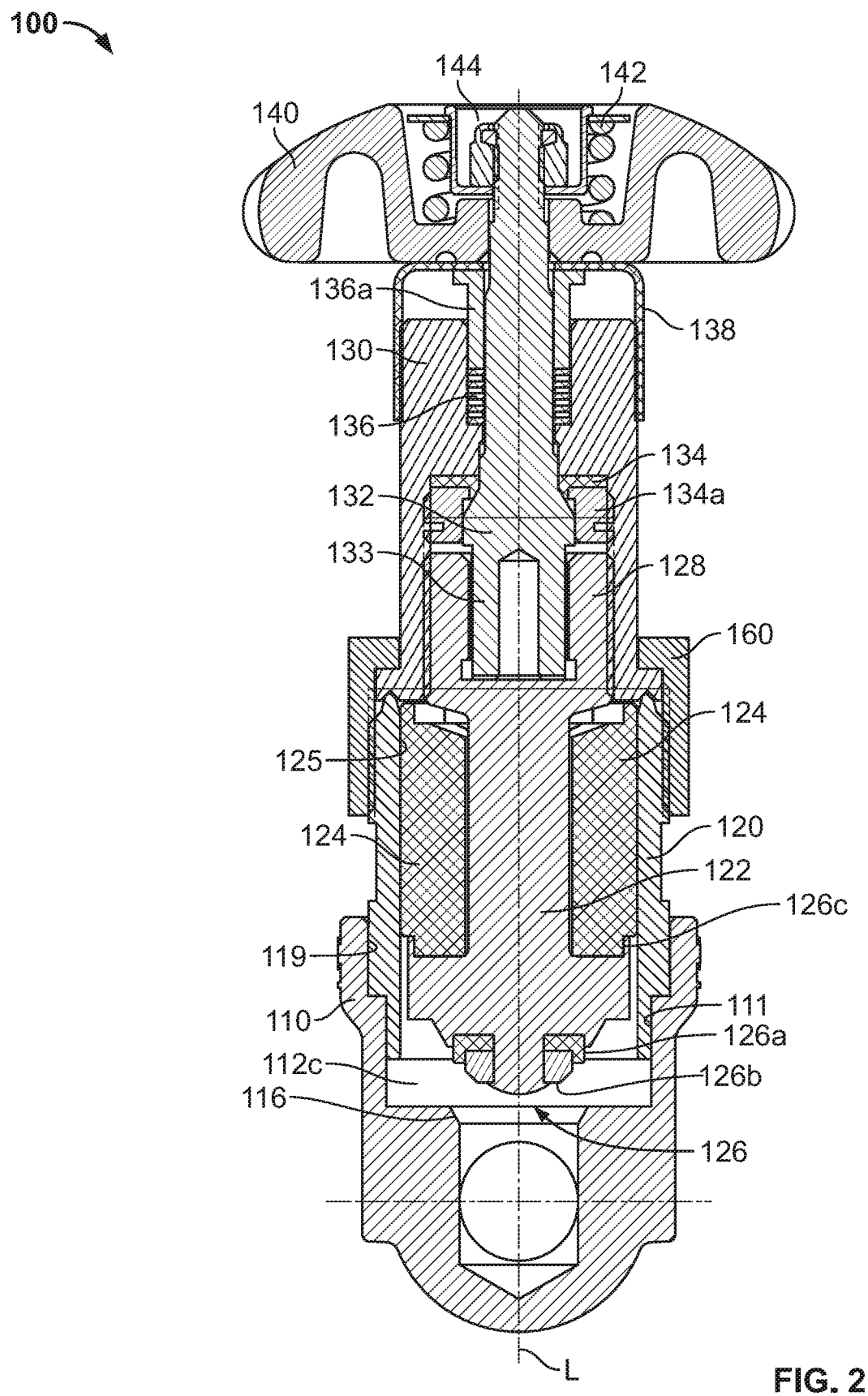
FIG. 2 is a cross-sectional side view of the cryogenic fluid shut-off valve of FIG. 1 showing the shut-off valve in an open position.

More specifically, as best shown in FIGS. 1 and 2, when valve 100 is in an open or unsealed position (i.e., a first position), cryogenic fluid may be transported into inlet passage 112a of valve 100, via the inlet fluid conduit 150a, through voids 112b, 112c into outlet passage 112d, and transported out of the valve 100 via the outlet fluid conduit 150b. Conversely, as best shown in FIG. 1A, when valve 100 is in a closed or sealed position (i.e., a second position), cryogenic fluid is blocked from being transported between inlet passage 112a and outlet passage 112d, thus preventing flow out of valve 100 via outlet fluid conduit 150b.

In the illustrated example, one or more of the inner surfaces 11 of the body 110 further define a tube receiving portion 119. As such, a first end of the valve tube 120 extends into the tube receiving portion 119 and at least a portion of void 112c of the body 110. In the illustrated example, the valve tube 120 is connected to the body 110 via a weld, however other attachment methods such as an interference fit, bonding, and the like are possible. Further, in the illustrated example, a second end of valve tube 120 is sealingly engaged to the valve stem 130. Valve stem 130 may also be referred to as a spindle guide. As such, the valve tube 120 and the valve stem 130 can be collectively referred to as a valve housing.

As discussed herein, valve tube 120 and valve stem 130 can be formed from austenitic stainless steel or other such material capable of withstanding extreme operating temperatures (e.g., −270° C. to +85° C.). In the illustrated example, the second end of valve tube 120 is in direct contact with the end of valve stem 130 such that a metal-to-metal seal is formed between valve tube 120 and valve stem 130. Further, in the illustrated example, valve tube 120 and valve stem 130 are coupled together via a nut 160 that corresponds to external threads of the valve tube 120 such that a fluid tight seal is formed between valve tube 120 and valve stem 130.

As further shown, the valve 100 includes a lower spindle 122, a buffer 124, a sealing portion 126, and an upper spindle engagement member 128 disposed within at least a portion of the valve tube 120. In various embodiments, the buffer 124 comprises two or more portions that form an annular member positioned circumferentially around at least a portion of the lower spindle 122. Furthermore, the sealing portion 126 includes a seat disc 126a, a seat disc retainer 126b that positions and couples the seat disc 126a to the sealing portion 126 of the lower spindle 122, and a lower spindle collar 126c defined around a circumference of the lower spindle 122 and extending axially away from the seat disc 126a. Seat disc 126a may be composed of a cryogenic resistant polymer material (e.g., polytetrafluoroethylene (PTFE), polychlorotrifluoroethylene (PCTFE), ultra-high-molecular-weight polyethylene (UHMWPE), or TFM™ 1600 PTFE).

As best shown in FIGS. 6A, 6B, 6C, and 13, one non-limiting example of the buffer 124 is formed from two semi-circular buffer portions 124a and 124b. The buffer portions 124a and 124b forming the buffer 124 are formed out of a cryogenic temperature resistant material, such as PTFE, PCTFE, UHMWPE, TFM™ 1600 PTFE, and the like. Buffer 124 minimizes the amount of liquid cryogenic fluid (e.g., LH2) traveling up the valve tube 120 into the valve stem 130 of the valve 100. Additionally, the buffer 124 collects particles and other such debris within valve 100 to minimize contamination of the seat disc 126a. While buffer 124 is shown to be formed by two semi-circular buffer portions 124a and 124b, it will be understood that the buffer can be formed by a different number (e.g., one or greater than two) of portions. The use of the buffer enables the reduction of the overall weight of valve 100.

In the illustrated example, the two buffer portions 124a and 124b cooperate to form buffer 124 having an outer surface 127 and an inner surface 129. More specifically, the outer surface 127 is composed of multiple outer surfaces including a flat and annular first surface 127a, a flat and cylindrical second surface 127b, a flat and annular third surface 127c, a flat and cylindrical fourth surface 127d, a flat and annular fifth surface 127e, a flat and cylindrical sixth surface 127f, a flat and annular seventh surface 127g, and a linearly sloped and annular eighth surface 127h. In the illustrated example, third surface 127c is connected to fourth surface 127d via a linearly sloped or curved surface (not labeled) and fourth surface 127d is connected to fifth surface 127e via a linearly sloped or curved surface (not labeled).

In the illustrated example, first surface 127a, second surface 127b, and third surface 127c define a notch 127i around a circumference of a bottom surface (i.e., a first portion) of the buffer 124. In various embodiments, the notch 127i corresponds to the lower spindle collar 126c of the sealing portion 126. As such, during assembly of the valve 100, the notch 127i engages with the lower spindle collar 126c to circumferentially align and couple the buffer 124 to the lower spindle 122. Furthermore, fourth surface 127d, fifth surface 127e, and sixth surface 127f define a collar 127j around a circumference of a top surface (i.e. a second portion) of the buffer 124. In the illustrated example, the collar 127j extends axially away from the seventh surface 127g and the eighth surface 127h of the buffer 124. In one example, during assembly, the two buffer portions 124a and 124b may be arranged around lower spindle 122 and this combination may be inserted into valve tube 120.

FIG. 6B shows one of the buffer portions 124a, with the understanding that the other buffer portion 124b in this example is identical thereto. Each buffer portion 124a, 124b has two generally flat contact surfaces 129a that contact corresponding contact portions 129a on the other buffer portion when assembled into buffer 124. In the illustrated example, the inner surface 129 of buffer 124 is composed of two semi-circular surfaces 129b formed on each buffer portion 124a, 124b to form inner surface 129 which defines a cylindrical bore. Buffer 124 is composed of two semi-circular buffer portions 124a and 124b that circumferentially surround the lower spindle 122 such that the inner surface 129 of each buffer portion 124a, 124b is operatively engaged or otherwise attached to the lower spindle 122. Furthermore, the flat contact surfaces 129a of buffer portion 124a are aligned with and connected to the flat contact surfaces 129a of buffer portion 124b. As such, the buffer portions 124a, 124b fit together to form buffer 124. In the illustrated example, the lower spindle collar 126c of the lower spindle 122 extends into the notch 127i to help circumferentially align and position the buffer 124 around the lower spindle 122. As such, buffer portions 124a and 124b of the buffer 124 are disposed between and held in place by the lower spindle 122 and an inner surface 125 of the valve tube 120. In the illustrated example, the buffer 124 and at least a portion of the lower spindle 122 are each sealingly and slidingly engaged with the inner surface 125 of the valve tube 120 such that lower spindle 122 and buffer 124 can move axially along longitudinal axis L while also continuing to limit the flow of fluid through valve tube 120.

In the illustrated example, the lower spindle 122, sealing portion 126, and upper spindle engagement member 128 are formed as a unitary structure and composed of austenitic stainless steel or other such material capable of withstanding extreme operating temperatures (e.g., −270° C. to +85° C.); however, other configurations are possible. Further, in the illustrated example, when the seat disc 126a and seat disc retainer 126b are aligned with and attached to the sealing portion 126 of the lower spindle 122, the sealing portion 126, the seat disc 126a, and the seat disc retainer 126b collectively define a bowl or arcuate shape that corresponds with a shape of valve seat 116 such that when the valve 100 is in the closed or sealed position (i.e., seat disc 126a is sealingly engaged with valve seat 116) cryogenic fluid flow between the first void 112b and second void 112c is blocked.

In the illustrated example, the upper spindle engagement member 128 includes multiple upper spindle engaging surfaces 128a that define an upper spindle receiving bore. The upper spindle engagement member 128 also includes external threads 128b that circumferentially surround an outer surface of the upper spindle engagement member 128 and correspond to internal threads of the valve stem 130. In the illustrated example, the upper spindle engagement member 128 axially extends from the valve tube 120 into the valve stem 130 such that the external threads 128b of the upper spindle engagement member 128 are threadably engaged with the internal threads of the valve stem 130. As such, rotation of the lower spindle 122 causes axial movement (e.g., upwards or downwards) of the lower spindle 122, buffer 124, and sealing portion 126 along longitudinal axis L.

Figure 8:
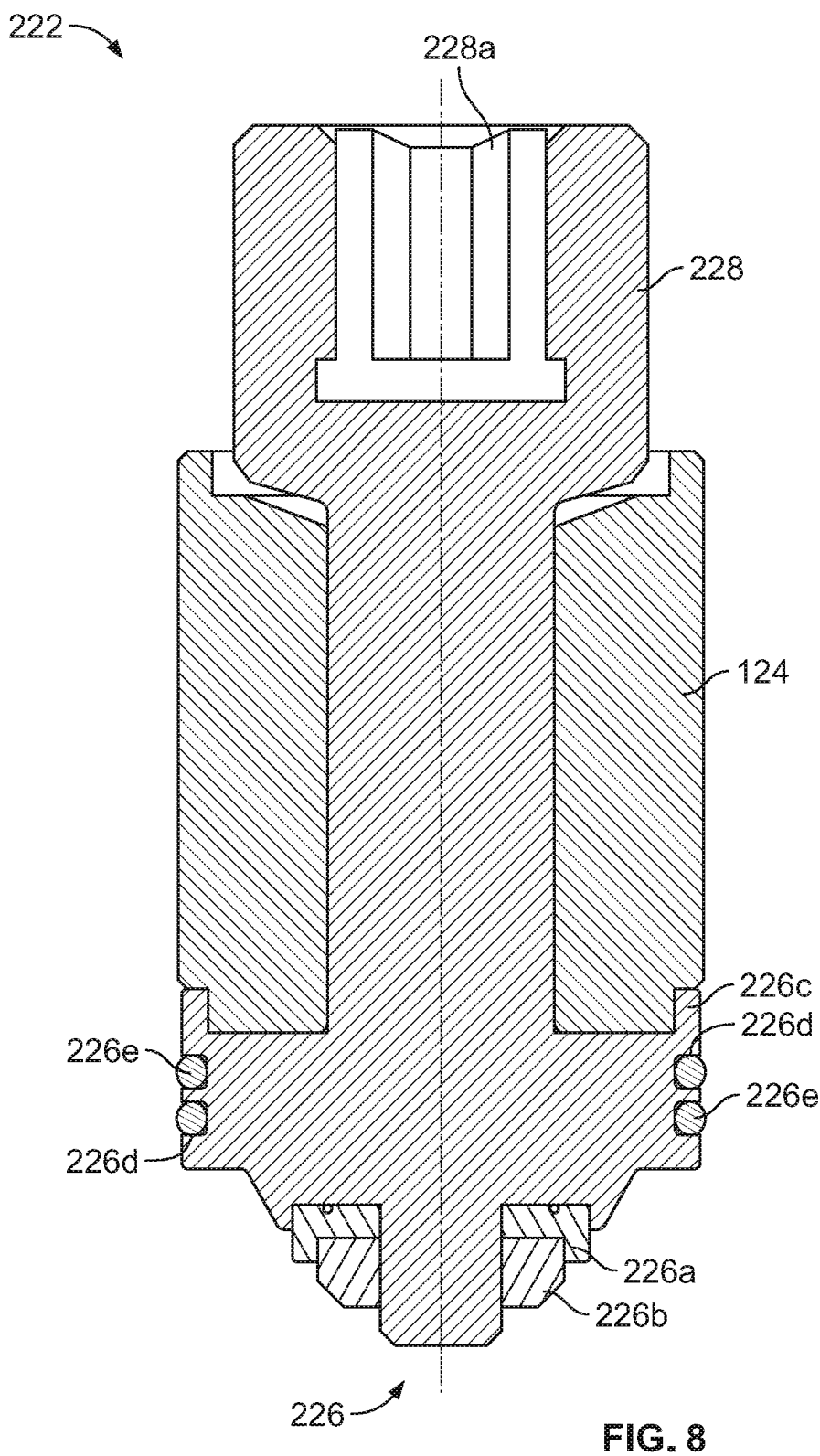
FIG. 8 is a cross-sectional view of an alternative spindle design in accordance with the teachings herein.
Figure 9:
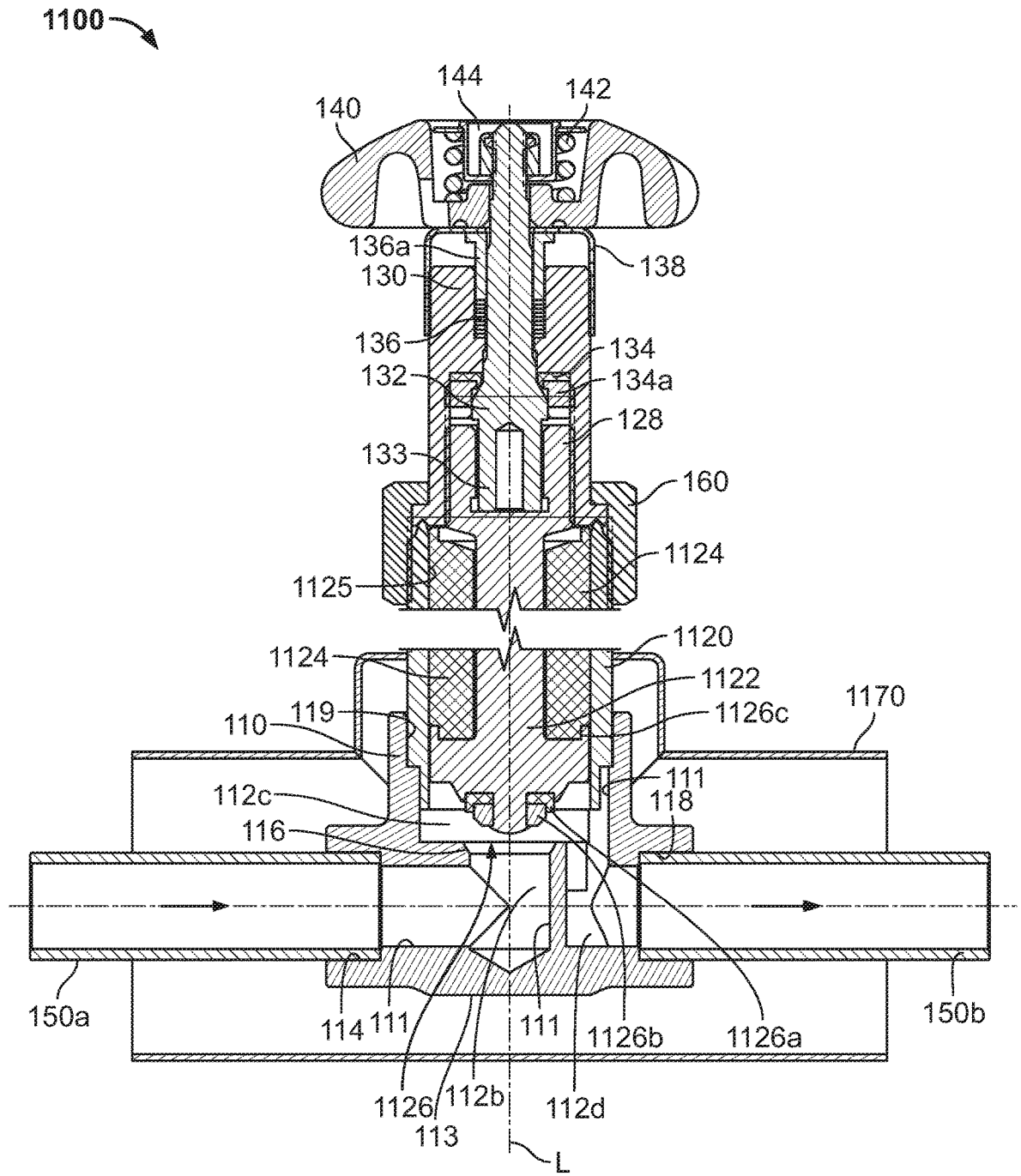
FIG. 9 is a cross-sectional view of a cryogenic fluid shut-off valve coupled to a fluid conduit showing a vacuum jacket enclosing a portion of the shut-off valve and showing the shut-off valve in an open position.
Figure 10:
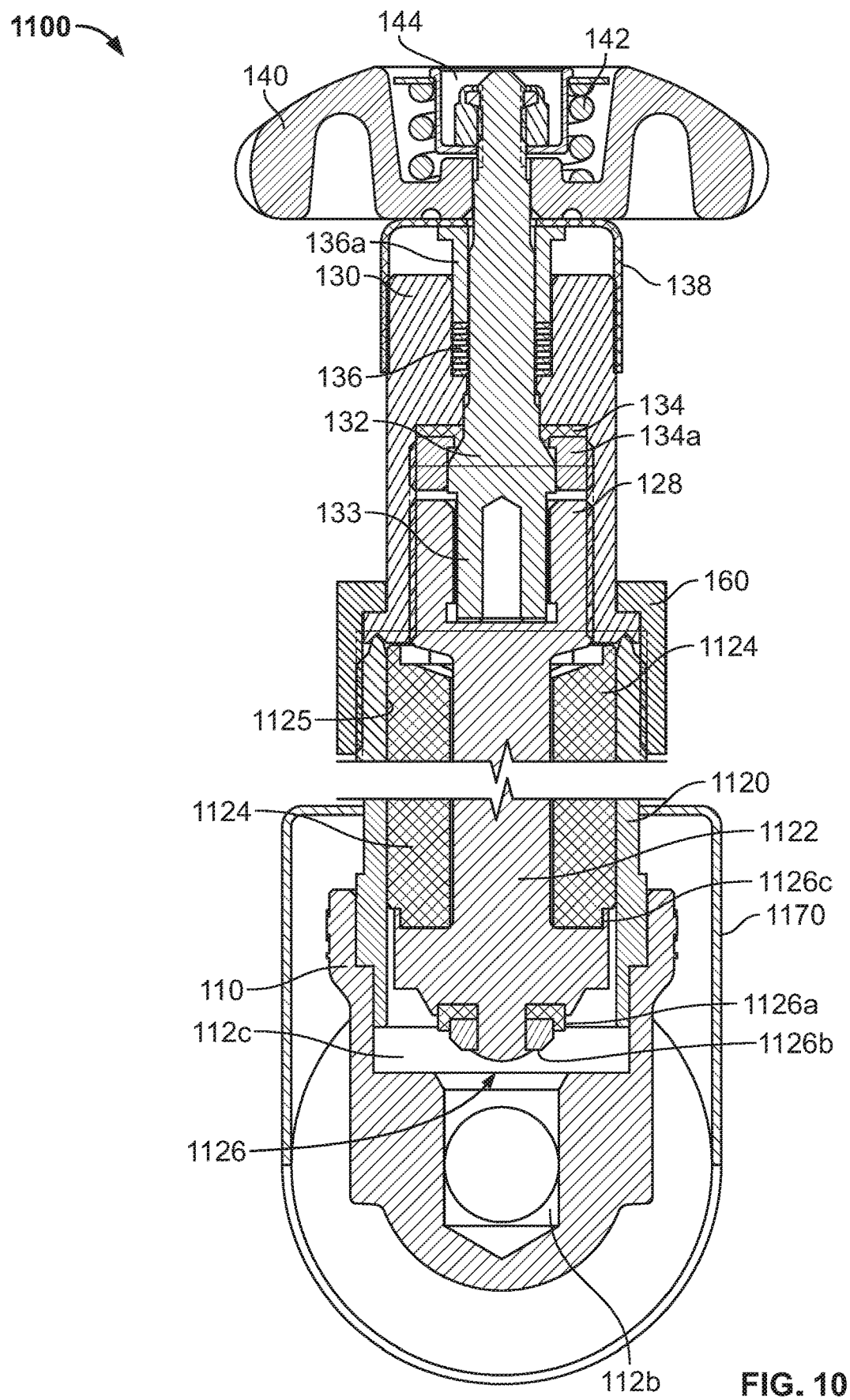
FIG. 10 is a cross-sectional side view of the cryogenic fluid shut-off valve of FIG. 9.
Figure 11:
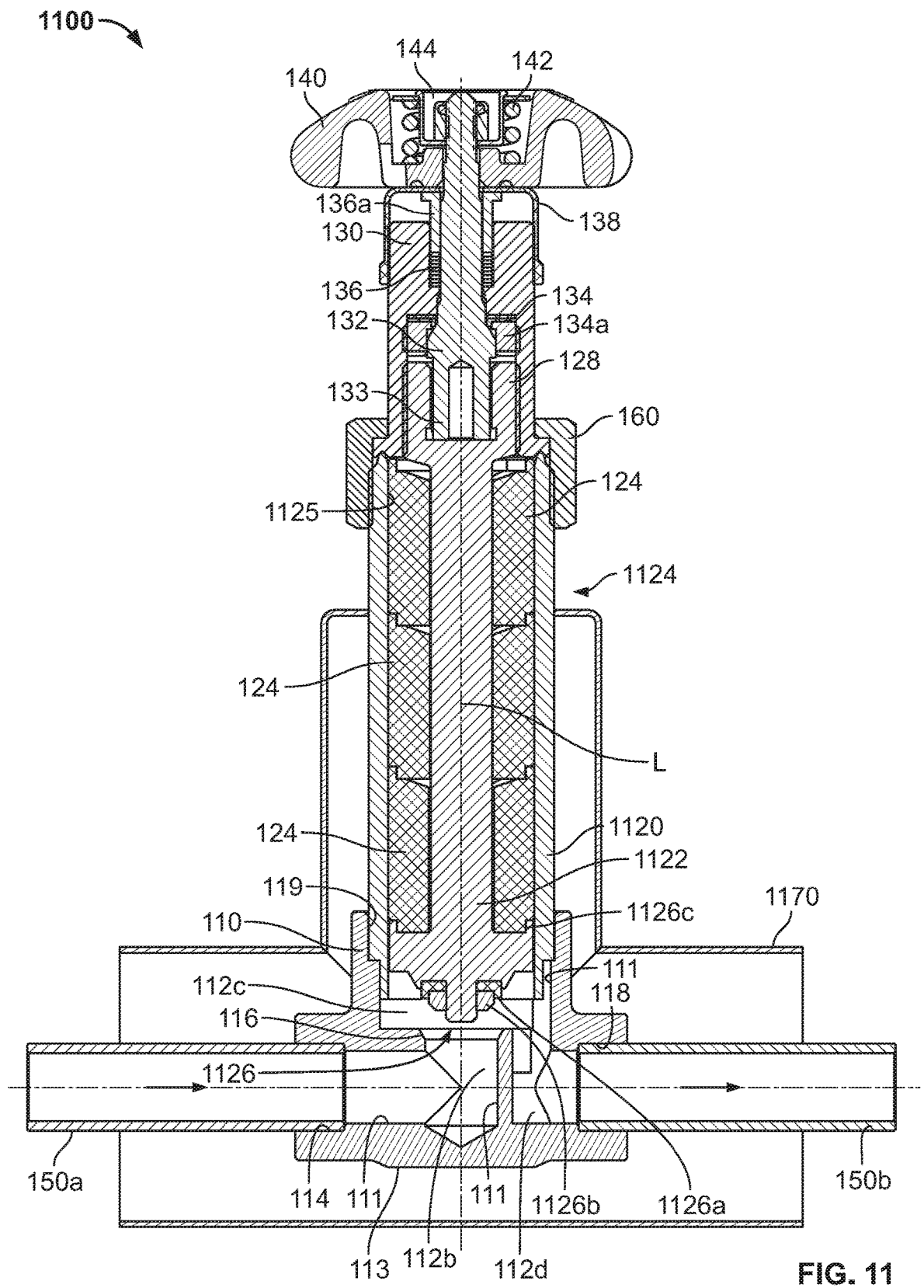
FIG. 11 is a cross-sectional view of a cryogenic fluid shut-off valve comprising an extended valve tube showing a vacuum jacket enclosing a portion of the shut-off valve and showing the shut-off valve in an open position.
Figure 12:
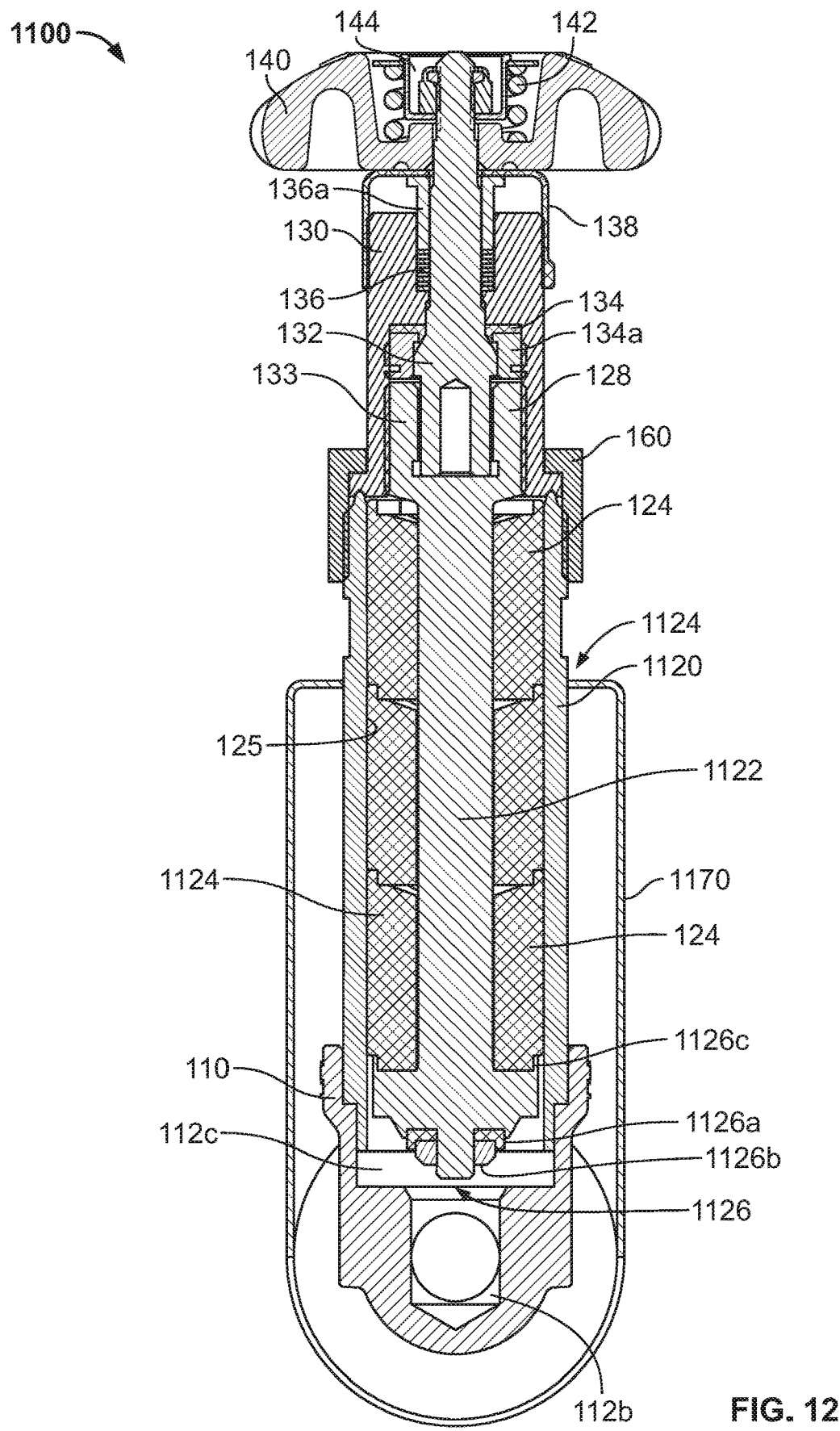
FIG. 12 is a cross-sectional side view of the cryogenic fluid shut-off valve of FIG. 11.
Figure 13:
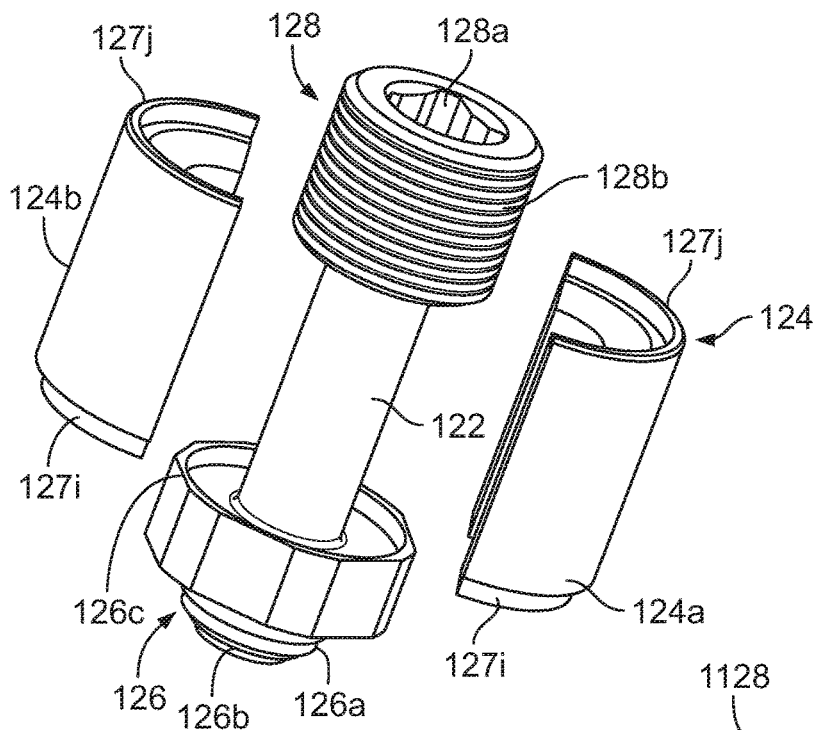
FIG. 13 is a perspective view showing the lower spindle and buffer of the cryogenic fluid shut-off valve of FIG. 1.
Figure 14:
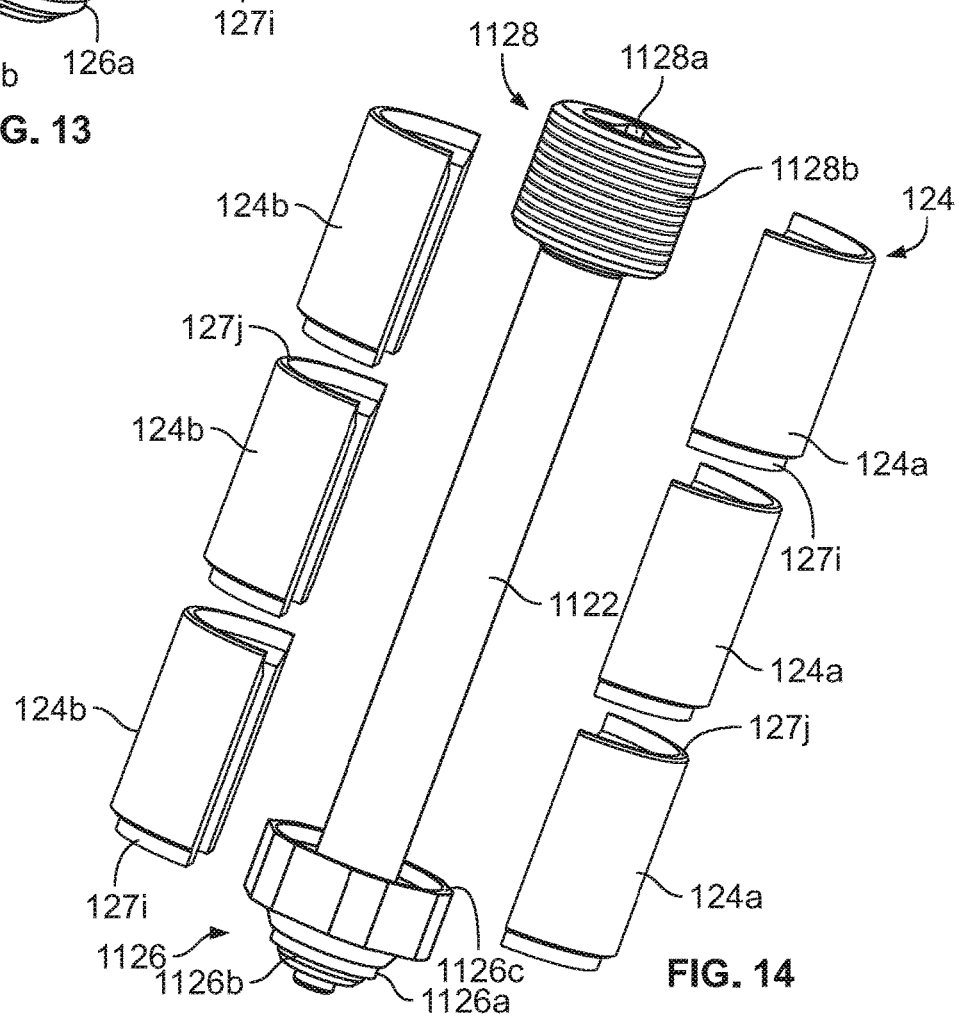
FIG. 14 is a perspective view showing the lower spindle and buffer of the cryogenic fluid shut-off valve of FIG. 11.

FIG. 8 illustrates an alternative lower spindle 222 that can replace the lower spindle 122 of valve 100. It should be appreciated that lower spindle 222 is similar to lower spindle 122 illustrated in FIGS. 1-3, 5A and SB, except for the differences discussed herein. As such, similar element numbers are used herein to illustrate similar or common elements shared between lower spindle 222 and lower spindle 122. Elements of lower spindle 222 use element numbers that correspond to the element numbers of lower spindle 122 with a "2" at the beginning of the element labels instead of an "1" (e.g., 122 becomes 222, 126 becomes 226, and the like).

In the illustrated example, the lower spindle 222, sealing portion 226, and upper spindle engagement member 228 are formed as a unitary structure and composed of austenitic stainless steel or other such material capable of withstanding extreme operating temperatures (e.g., −270° C. to +85° C.); however, other configurations are possible. The sealing portion 226 of lower spindle 222 includes a seat disc 226a, a seat disc retainer 226b, a lower spindle collar 226c, a sealing portion groove 226d circumferentially formed in and around an outer surface of the sealing portion 226, and a sealing portion O-ring 226e disposed within the sealing portion groove 226d. In the illustrated example, the sealing portion O-ring 226e is formed out of PTFE, PCTFE, or other such material capable of withstanding cryogenic temperatures (e.g., −270° C.). As such, the sealing portion O-ring 226e forms a fluid tight seal between the sealing portion 226 of lower spindle 222 and the inner surface 125 of valve tube 120. It should be appreciated that while lower spindle 222 illustrates two sealing portion grooves 226d and sealing portion O-rings 226e, a different number of sealing portion grooves and O-rings can be used to form a fluid tight seal between the lower spindle and valve tube.

Figure 3:
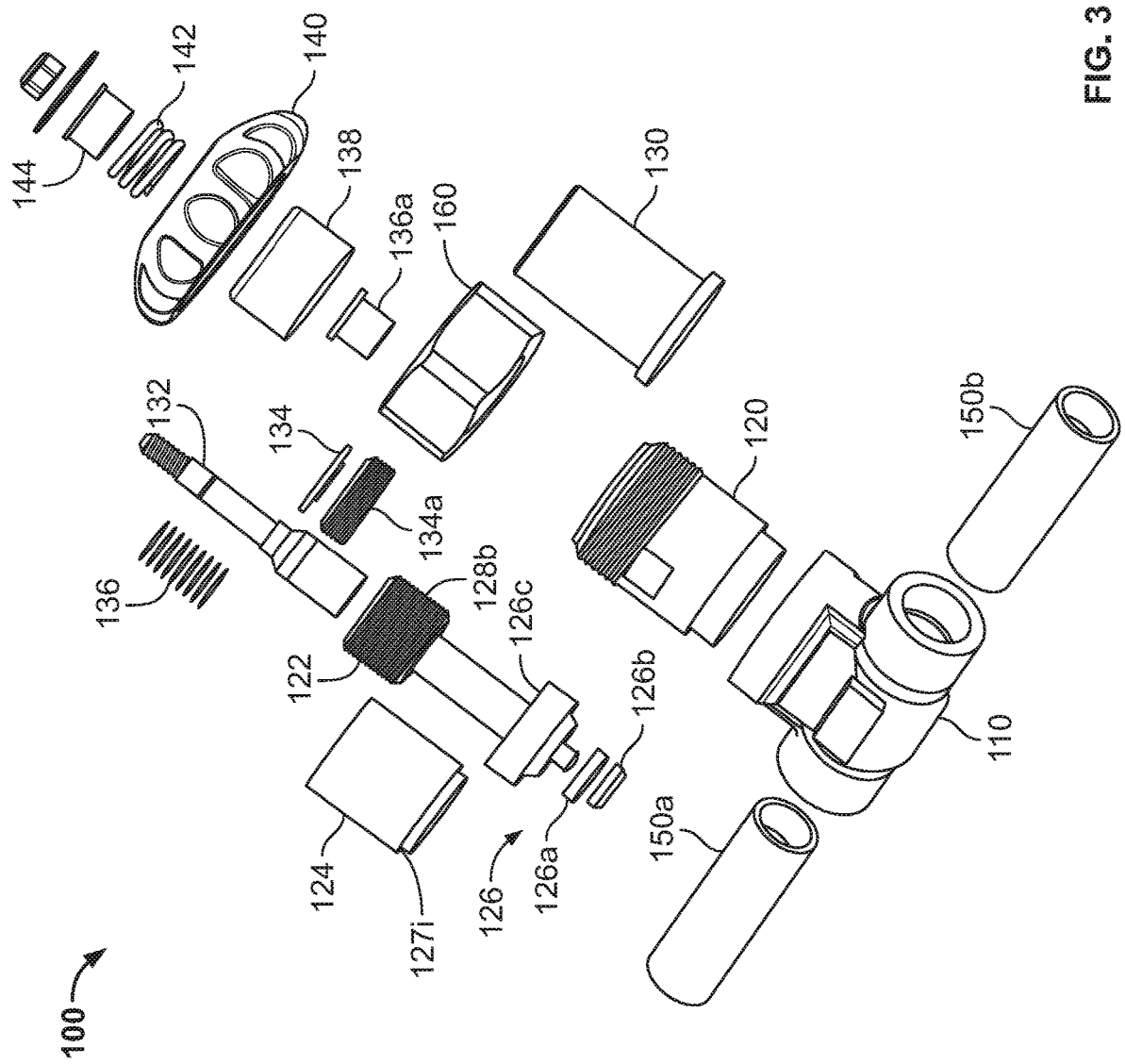
FIG. 3 is an exploded perspective view of the cryogenic fluid shut-off valve of FIG. 1.
Figure 4:
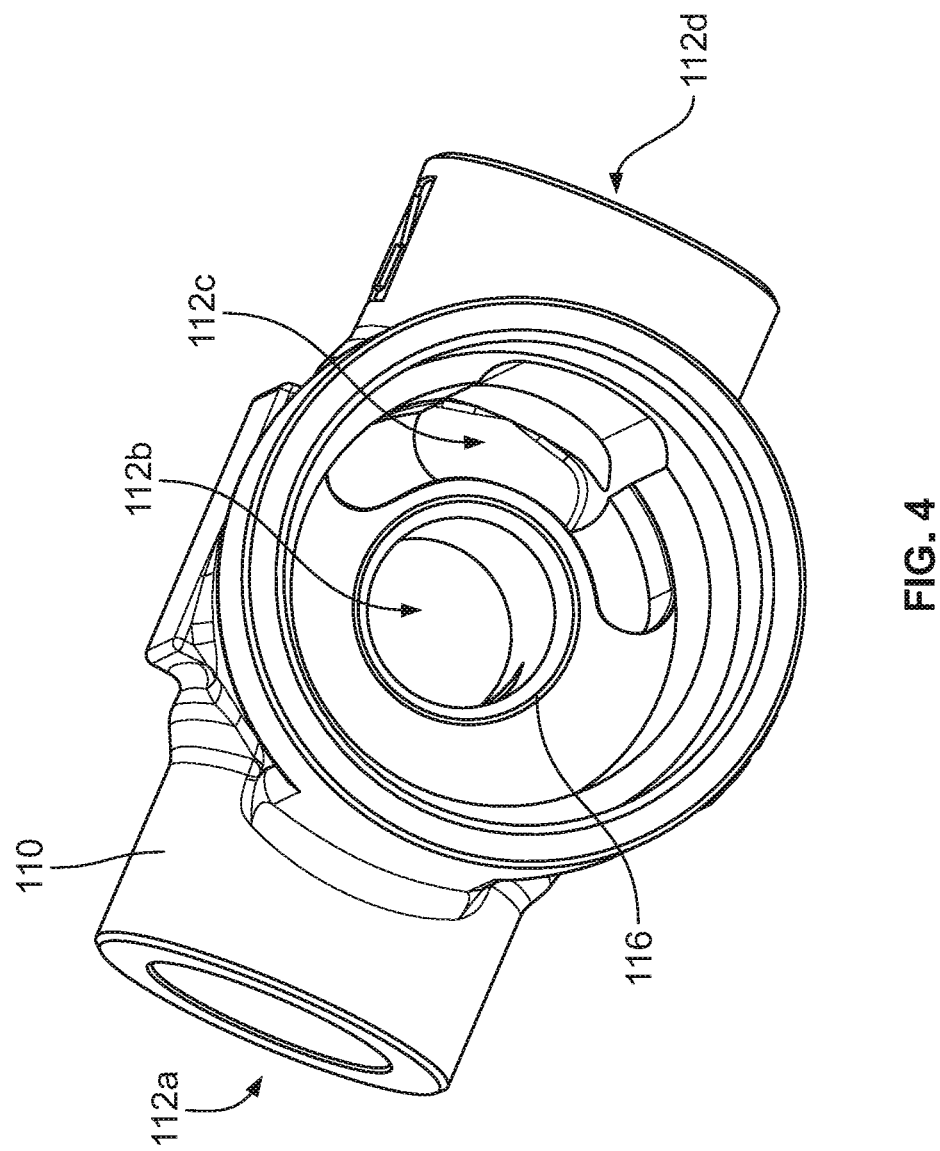
FIG. 4 is a perspective view of the valve body of the cryogenic fluid shut-off valve of FIG. 1.

As further shown in FIGS. 1-3, and SC, the valve 100 includes an upper spindle 132, a first sealing member 134, a retaining member 134a, and a second sealing member 136 disposed in valve stem 130. In the illustrated example, first sealing member 134 is formed out of PTFE, PCTFE or other such material capable of withstanding cryogenic temperatures (e.g., −270° C.). The first sealing member 134 and retaining member 134a are each disposed circumferentially around upper spindle 132 and extend radially outward from the upper spindle 132. The first sealing member 134 is supported by a retaining member 134a to position the first sealing member 134 within valve stem 130 to form a fluid tight seal between upper spindle 132 and valve stem 130. The retaining member 134a is formed out of austenitic stainless steel or other such material capable of withstanding extreme operating temperatures (e.g., −270° C. to +85° C.).

Figure 7A:
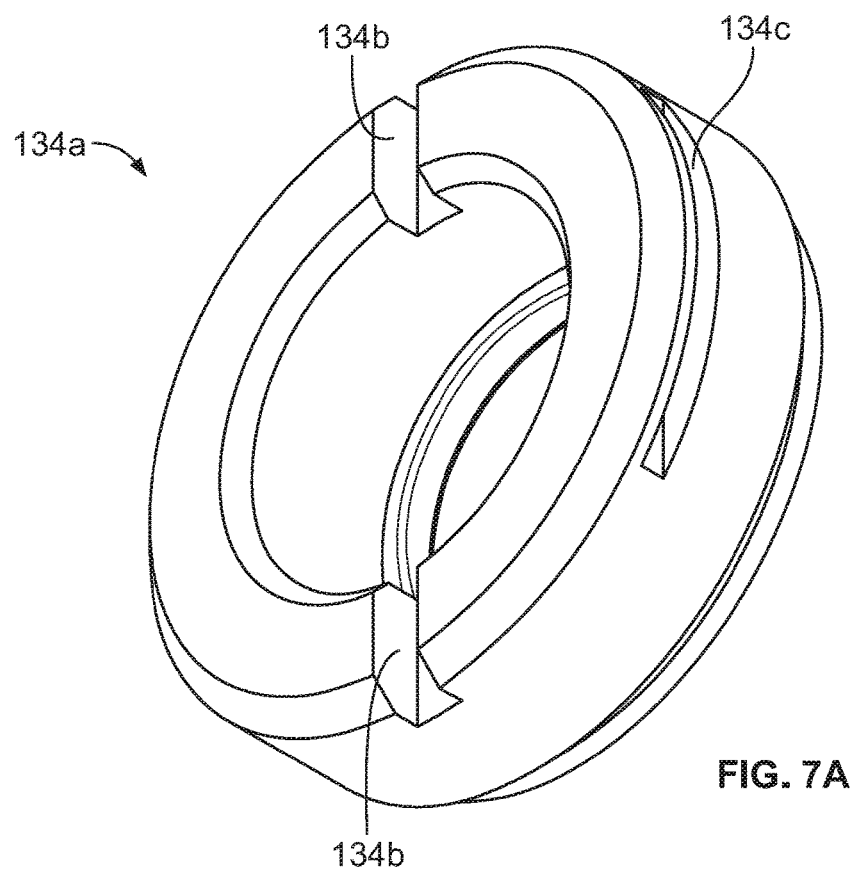
FIG. 7A is a perspective view of the retaining member of the cryogenic fluid shut-off valve of FIG. 1.
Figure 7B:
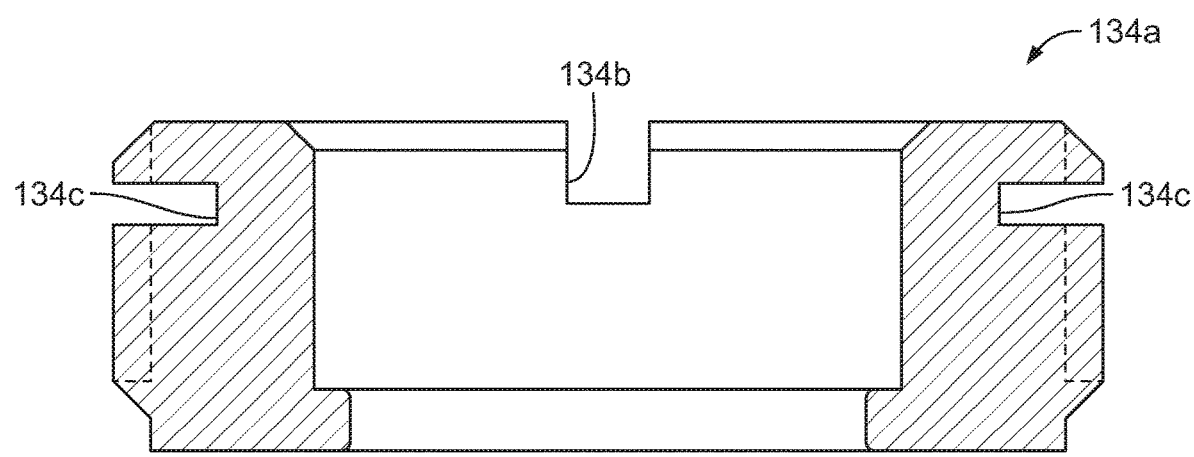
FIG. 7B is a cross-sectional view of the retaining member of FIG. 7A.

In the illustrated example, the retaining member 134a includes external threads (not shown) that circumferentially surround an outer surface of retaining member 134a. The external threads of retaining member 134a are threadably engaged with internal threads of the valve stem 130 to align and secure the retaining member 134a within the valve tube 120. In the illustrated example, when the retaining member 134a is threaded or otherwise tightened into the valve stem 130, the first sealing member 134 forms a fluid tight seal between retaining member 134a, upper spindle 132, and valve stem 130. Furthermore, when the retaining member 134a is threaded or otherwise tightened into the valve stem 130, retaining member 134a is operatively engaged to the upper spindle 132 to maintain the position and prevent slanting of the upper spindle 132 in the valve stem 130 relative to longitudinal axis L. As best shown in FIGS. 7A and 7B, the retaining member 134a further includes multiple slots 134b and 134c that help to tighten and fixedly attach the retaining member 134a to valve stem 130 and upper spindle 132. For example, once the retaining member 134a is threaded into the valve stem 130 the retaining member 134a is punched to collapse and/or deform a portion of the retaining member 134 adjacent the slots 134b and 134c. In various embodiments, punching the retaining member 134a causes deformation of at least a portion of the external threads of the retaining member 134a such that the retaining member 134a is fixedly held in place within the valve stem 130.

In the illustrated example, the second sealing member 136 comprises multiple layers (e.g., five layers) of PTFE, PCTFE or other such material capable of withstanding cryogenic temperatures (e.g., −270° C.). The multiple layers of the second sealing member 136 form a packing seal that extends radially outward from and axially upward along upper spindle 132. As such, the packing retaining member 136a circumferentially surrounds a portion of the upper spindle 132 and packs or otherwise positions the second sealing member 136 around the upper spindle 132 to form a fluid tight seal between upper spindle 132 and valve stem 130.

A valve cap 138, which may also be referred to as a dust cap or bonnet, is mounted on a top end of valve stem 130 to prevent outside moisture and other such external contaminants from entering the valve stem 130 of valve 100. In the illustrated example, the upper spindle 132 extends axially through valve stem 130 along longitudinal axis L. Further, in the illustrated example, a portion of upper spindle 132 extends axially through valve stem 130. At least a portion of the upper spindle 132 extends through the valve cap 138 and is connected to the valve actuating member 140. In the illustrated example, the valve cap 138 is operatively engaged with the packing retaining member 136a to maintain the position of the packing retaining member 136a and second sealing member 136 around the upper spindle 132.

In the illustrated example, the upper spindle 132 also includes a lower spindle engagement member 133 that includes multiple lower spindle engaging surfaces 133a that define multiple circumferentially spaced flats of the lower spindle engagement member 133. During operation of valve 100, the flats defined by the lower spindle engaging surfaces 133a correspond to and slidingly engage with the upper spindle engaging surfaces 128a that define the upper spindle receiving bore of the lower spindle 122. In some embodiments, lower spindle 222 of FIG. 8, can be used in valve 100 and the flats defined by the lower spindle engaging surfaces 133a of the upper spindle 132 correspond to and slidingly engage with the upper spindle engaging surfaces 228a that define the upper spindle receiving bore of the lower spindle 222. As such, the lower spindle engagement member 133 of the upper spindle 132 extends into and is received by the upper spindle receiving bore of the lower spindle 122 to form a spindle assembly (sometimes referred to herein as spindle for brevity). During operation of the valve 100, rotation of the upper spindle 132 causes a subsequent rotation of the lower spindle 122.

In the illustrated example, the valve actuating member 140 includes a spring 142 and an upper spindle receiving member 144 connected to the valve actuating member 140 and the upper spindle 132. In the illustrated example, the valve actuating member 140 is a handle that is rotatable about longitudinal axis L. As such, rotation of the valve actuating member 140 causes rotation of upper spindle 132 and lower spindle 122 to actuate the valve 100 into the open position or closed position. More specifically, as best shown in FIG. 1, when the valve 100 is in the open or unsealed position (i.e., seat disc 126a is disengaged from valve seat 116), rotation of the valve actuating member 140 causes a corresponding rotation of upper spindle 132 and lower spindle 122 such that the lower spindle 122, buffer 124, and sealing portion 126 axially move along longitudinal axis L towards the valve seat 116 to actuate the valve 100 into the closed position (i.e., seat disc 126a is sealingly engaged with valve seat 116). Conversely, as best shown in FIG. 1A, when the valve 100 is in the closed position (i.e., seat disc 126a is sealingly engaged with valve seat 116), rotation of valve actuating member 140 causes a corresponding rotation of upper spindle 132 and lower spindle 122 such that lower spindle 122, buffer 124, and seat disc 126a axially move along longitudinal axis L away from valve seat 116 to actuate the valve 100 into the open position (i.e., seat disc 126a is disengaged from valve seat 116).

In the illustrated example, the spring 142 biases the upper spindle 132 axially towards valve actuating member 140 such that upper spindle 132 forms a tight seal with first sealing member 134. Further, pushing down on the valve actuating member 140 applies an axial force away from the valve actuating member 140 that acts on second sealing member 136 to tightly pack the five or more sealing layers of the second sealing member 136.

Valve 100 is configured as a short stem or low profile valve with a height of approximately 6 inches (within manufacturing tolerances). In various other embodiments, the height of the valve can be changed by using valve tubes and lower spindles with different lengths. For example, to increase the height of the valve, a longer valve tube, a longer lower spindle, and a longer buffer can be used in the assembly of the valve.

FIGS. 9 to 12 and 14 to 16 illustrate a second exemplary cryogenic fluid shut-off valve 1100 (sometimes referred to herein as valve 1100 for brevity). It should be appreciated that valve 1100 is similar to valve 100 illustrated in FIGS. 1 to 7B and 13, except for the differences discussed herein. As such, the same element numbers are used herein to illustrate similar or common elements shared between valve 1100 and valve 100. Elements of valve 1100 that correspond to but have differences from valve 100 use element numbers that correspond to the element numbers of valve 100 with an additional "1" at the beginning of the element labels (e.g., 120 becomes 1120, 124 becomes 1124 and the like). It should also be appreciated that the general operation of the valve 1100 is the same as the general operation of the valve 100, except as discussed herein. It should therefore be appreciated that the disclosure discussed herein with respect to valve 100 applies to valve 1100, except where such disclosure is inconsistent with the elements of valve 1100, as discussed herein.

As shown in the cross-sectional views of FIGS. 9 to 12, valve 1100 includes the body 110, an extended valve tube 1120 connected to the body 110, a valve stem 130 connected to the extended valve tube 1120, a valve actuating member 140, and a vacuum jacket 1170. In the illustrated example, the valve 1100 has a longitudinal axis L and body 110, extended valve tube 1120, valve stem 130, and valve actuating member 140 are aligned with one another along longitudinal axis L. In the illustrated example, the body 110, extended valve tube 1120, and valve stem 130 can be formed out of austenitic stainless steel or other such material capable of withstanding extreme operating temperatures (e.g., −270° C. to +85° C.).

Similar to valve 100, when valve 1100 is in an open or unsealed position (i.e., a first position), cryogenic fluid may be transported into inlet passage 112a of valve 1100, via the inlet fluid conduit 150a, through voids 112b, 112c into outlet passage 112d, and transported out of the valve 1100 via the outlet fluid conduit 150b. Conversely, when valve 1100 is in a closed or sealed position (i.e., a second position), cryogenic fluid may blocked from being transported from inlet passage 112a of valve 1100, through voids 112b, 112c into outlet passage 112d, and transported out of the valve 1100 via the outlet fluid conduit 150b.

As further shown in FIGS. 9 to 12, valve 1100 forms an extended or long stem valve including an extended lower spindle 1122, extended buffer 1124, sealing portion 1126, and upper spindle engagement member 128 disposed within at least a portion of the extended valve tube 1120. In the illustrated example, the extended valve tube 1120 and extended lower spindle 1122 have a different (e.g., longer) length than corresponding valve tube 120 and lower spindle 122 of valve 100. As such, to accommodate the different length of the extended valve tube 1120 and extended lower spindle 1122, the extended buffer 1124 includes multiple buffers 124 that are stacked or otherwise fit together to fill in the open area of the extended valve tube 1120. For example, as best shown in FIGS. 11, 12 and 14-16, six semi-circular buffer portions 124a, 124b are fit together to form three buffers 124 that combine to form extended buffer 1124 to circumferentially surround the extended lower spindle 1122. As such, the extended buffer 1124 prevents liquid cryogenic fluid (e.g., LH2) from traveling up the extended valve tube 1120 into the valve stem 130 of the valve 1100. Additionally, the extended buffer 1124 collects particles and other such debris within the valve 1100 to minimize contamination of the seat disc 126a. As before, buffer portions 124a, 124b may be composed of cryogenic temperature resistant material such as PTFE, PCTFE, UHMWPE, TFM™ 1600 PTFE and the like.

As best shown in FIG. 15, the notch 127*i* of a first buffer 124 corresponds to the collar 1126*c* of the extended lower spindle 1122 to position the first buffer 124 around the extended lower spindle 1122. The notch 127*i* of a second buffer 124 corresponds to the collar 127*j* of the first buffer 124 such that the bottom surface of the second buffer 124 is engaged with the top surface of the first buffer 124. Furthermore, the notch 127*i* of a third buffer 124 corresponds to the collar 127*j* of the second buffer 124 such that the bottom surface of the third buffer 124 is engaged with the top surface of the second buffer 124. As such, the extended buffer 1124 includes three buffers 124 that are stacked on top of one another and disposed between the extended lower spindle 1122 and an inner surface 1125 of the extended valve tube 1120. As such, the extended buffer 1124 and at least a portion of the extended lower spindle 1122 are each sealingly and slidingly engaged with the inner surface 1125 of the extended valve tube 1120 such that the extended lower spindle 1122 and extended buffer 1124 can move axially along longitudinal axis L while also maintaining a fluid tight seal with the extended valve tube 1120. It will be appreciated that while the illustrated example shows the extended buffer 1124 being composed of three buffers 124, a different number of buffers can be used to form a desired length of the extended buffer. By way of example only, the extended buffer 1124 could consist of two buffer members or four buffer members instead of the three depicted in FIGS. 10 and 11.

In the illustrated example, the vacuum jacket 1170 encloses the body 110 and at least a portion of the extended valve tube 1120 of valve 1100. As shown in FIGS. 8 to 11, the vacuum jacket 1170 is connected to the extended valve tube 1120 via one or more welds, however other attachment methods are possible. In the illustrated example, the vacuum jacket 1170 includes a plurality of surfaces 1172 that may be parallel, perpendicular, and/or sloped with respect to longitudinal axis L. One or more of the surfaces 1172 define a top opening 1174 in the vacuum jacket 1170 such that a portion of the extended valve tube 1120, the valve stem 130, and valve actuating member 140 extend through the top opening 1174 and axially away from the vacuum jacket 1170. In certain embodiments, attachment of the vacuum jacket 1170 to valve 1100 may cause extended valve tube 1120, extended lower spindle 1122, and extended buffer 1124 to be configured with a different (e.g., longer) length than valve tube 120 and lower spindle 122 of valve 100 of FIGS. 1 to 3.

In the illustrated embodiment, the general operation of valve 1100 is the same as the general operation of valve 100, except as discussed herein. It should therefore be appreciated that the disclosure discussed herein with respect to valve 100 applies to valve 1100, except where such disclosure is inconsistent with the elements of valve 1100, as discussed herein.

Figure 18:
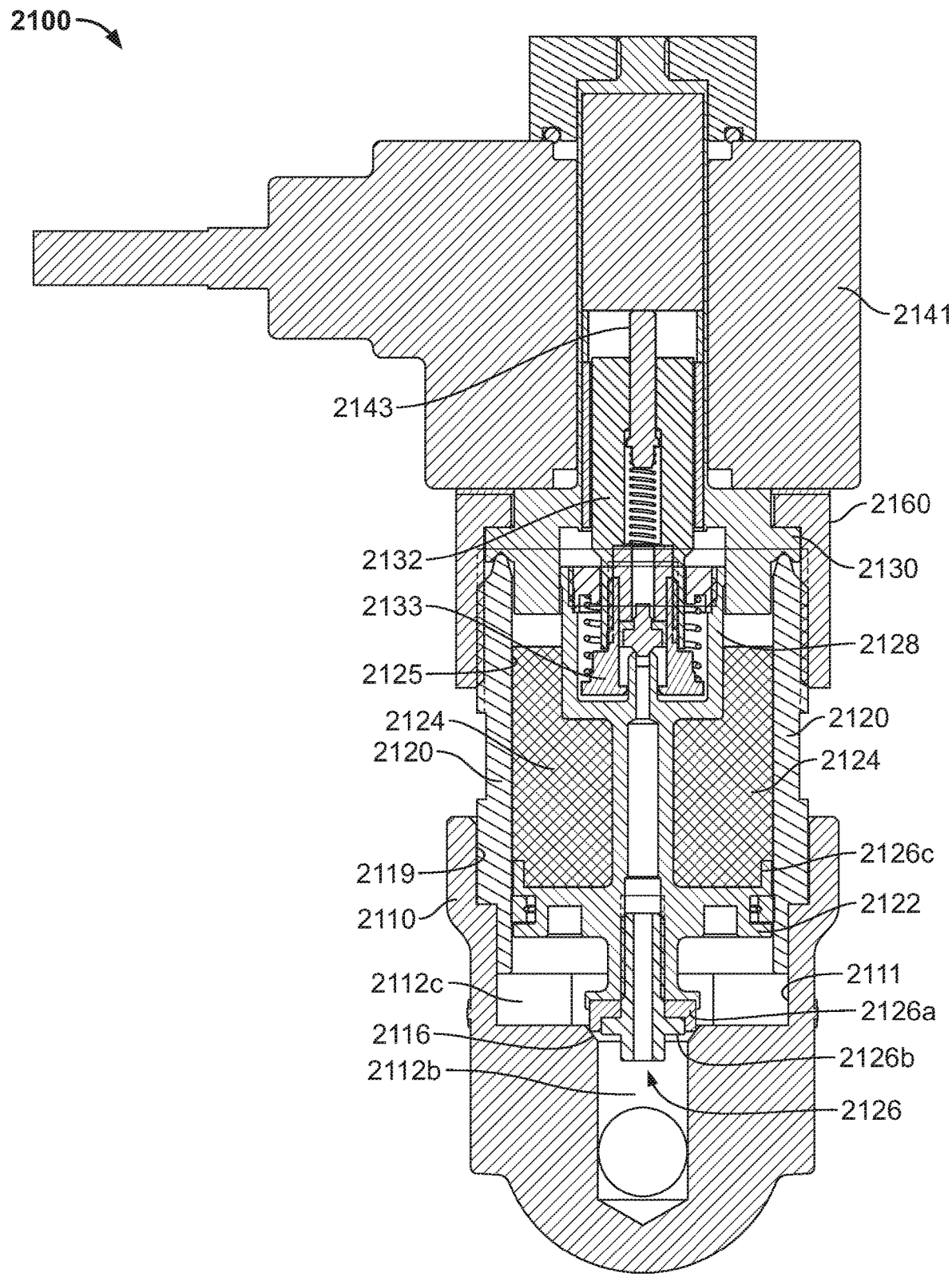
FIG. 18 is a cross-sectional side view of the cryogenic fluid shut-off valve of FIG. 17.
Figure 19:
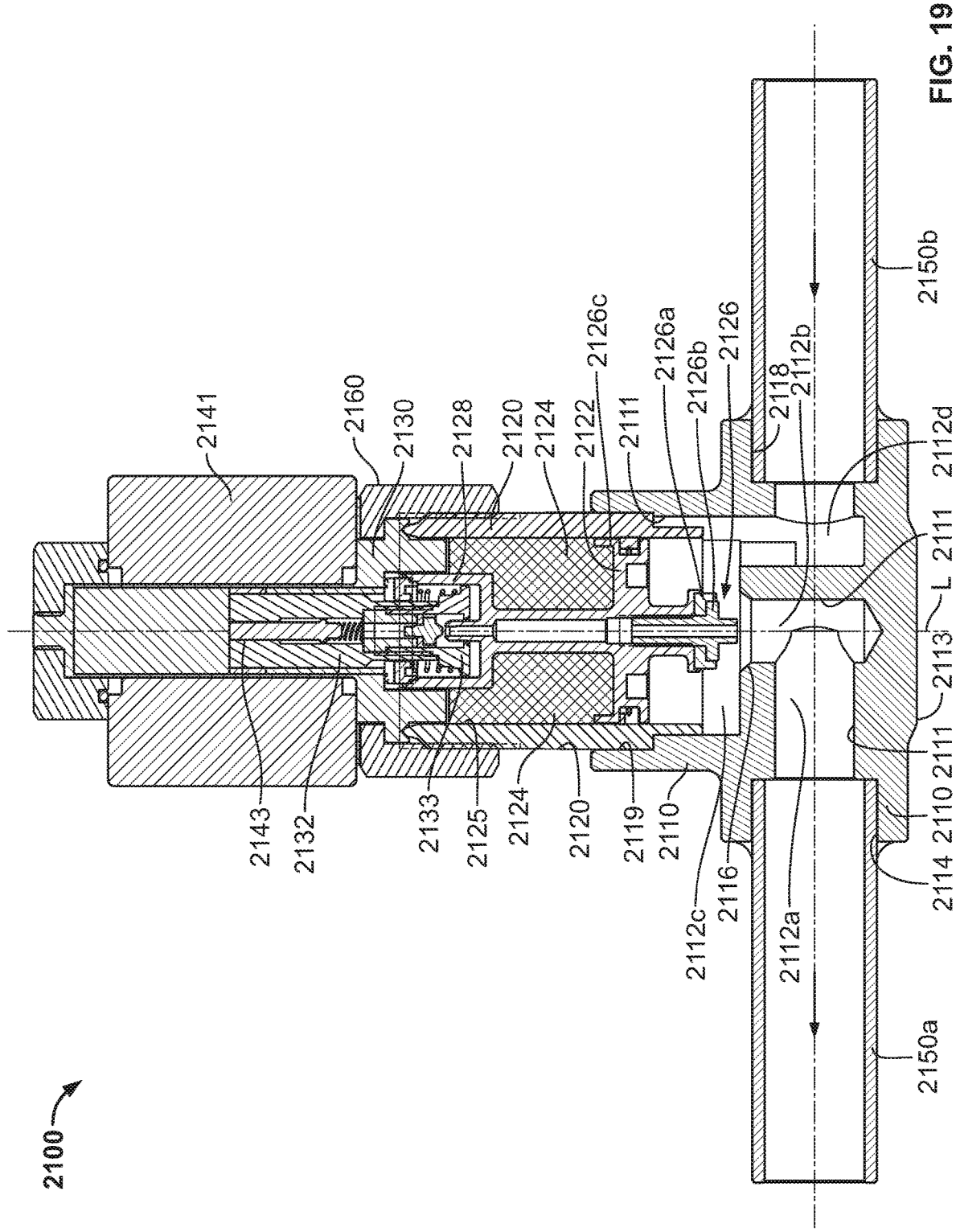
FIG. 19 is a cross-sectional view of the cryogenic fluid shut-off valve of FIG. 17 showing the shut-off valve in an open position.

FIGS. 17-19 illustrate a further embodiment of a cryogenic fluid shut-off valve 2100 (sometimes referred to herein as valve 2100 for brevity). It should be appreciated that valve 2100 is similar to valve 100 illustrated in FIGS. 1 to 7B and 13, except for the differences discussed herein. As such, element numbers used herein with respect to the valve 2100 are identical to the corresponding element numbers used herein with respect to valve 100 with an additional "2" at the beginning of the element labels (e.g., 110 becomes 2110, 120 becomes 2120, and the like). It should also be appreciated that the general operation of valve 2100 is the same as the general operation of valve 100, except as discussed herein. It should therefore be appreciated that the disclosure discussed herein related to valve 100 applies to valve 2100, except where such disclosure is inconsistent with the elements of valve 1100, as discussed herein.

As shown in the cross-sectional views of FIGS. 17-19, valve 2100 includes a body 2110, a valve tube 2120 connected to the body 2110, a valve stem 2130 connected to valve tube 2120, and a valve actuating member 2141. In the illustrated example, valve 2100 has a longitudinal axis L and the body 2110, valve tube 2120, valve stem 2130, and valve actuating member 2141 are aligned with one another along longitudinal axis L. In the illustrated example, the body 2110, valve tube 2120, and valve stem 2130 can be formed out of austenitic stainless steel or other such material capable of withstanding extreme operating temperatures (e.g., −270° C. to +85° C.).

Similar to valve 100, body 2110 of valve 2100 includes a plurality of inner surfaces 2111 that may be parallel, perpendicular, and/or sloped with respect to longitudinal axis L. The plurality of inner surfaces 2111 define a plurality of voids or passages 2112 within body 2110. Body 2110 also includes multiple outer surfaces 2113 that may be parallel, perpendicular, and/or sloped with respect to longitudinal axis L.

In the illustrated example, outlet passage 2112*a* is in fluid communication with void 2112*b*, void 2112*c* is in fluid communication with void 2112*b*, and inlet passage 2112*d* is in fluid communication with void 2112*c*. Thus, inlet passage 2112*d*, void 2112*c*, void 2112*b*, and outlet passage 2112*a* collectively define a fluid pathway through the body 2110 of the valve 2100. As such, during operation, the valve 2100 can be selectively actuated (i.e., opened and closed) to control the flow of cryogenic fluid through the fluid pathway. It should be appreciated that fluid flows through the fluid pathway of body 2110 of valve 2100 in the opposite direction compared to the fluid pathway of body 110 of valve 100. That is, fluid enters body 2110 of valve 2100 via inlet passage 2112*d* and exits body 2110 of valve 2100 via outlet passage 2112*a* and fluid enters body 110 of the valve 100 via inlet passage 110*a* and exits the body 110 of the valve 100 via outlet passage 112*d*. As such, body 2110 is similar to body 110 and valve 2100 can be selectively operated similar to valve 100 to control fluid flow through the valve fluid pathway.

More specifically, as shown in FIG. 19, when the valve 2100 is in an open or unsealed position (i.e., a first position), cryogenic fluid may be transported into inlet passage 2112*d*, via the inlet fluid conduit 2150*b*, through voids 2112*c* and 2112*b*, into outlet passage 2112*a*, and transported out of valve 2100 via the outlet fluid conduit 2150*a*. Conversely, as shown in FIGS. 16 and 17, when the valve 2100 is in a closed or sealed position (i.e., a second position), cryogenic fluid may blocked from being transported from inlet passage 2112*d*, through voids 2112*c* and 2112*b*, into outlet passage 2112*a*, and transported out of the valve 2100 via the outlet fluid conduit 2150*a*.

As further shown in FIGS. 17 to 19, the valve 2100 includes a lower spindle 2122, a buffer 2124, a sealing portion 2126, and an upper spindle engagement member 2128 disposed within at least a portion of the valve tube 2120. Buffer 2124 may comprise two or more portions that form an annular member positioned circumferentially around the lower spindle 2122. For example, the buffer 2124 can be formed from two semi-circular portions of cryogenic temperature resistant material such as PTFE, PCTFE, UHMWPE, TFM™ 1600 PTFE, and the like that may be joined together to circumferentially surround the lower spindle 2122. As such, buffer 2124 prevents liquid cryogenic fluid (e.g., LH2) from traveling up the valve tube 2120 into valve stem 2130 of valve 2100. Additionally, buffer 2124 collects particles and other such debris within the valve 2100 to minimize contamination of seat disc 2126a. In an embodiment, buffer 2124 may be an extended buffer consisting of a plurality of buffers 2124 joined together, similar to that shown in FIGS. 11 and 12.

In the illustrated example, the buffer 2124 is connected to or otherwise attached to the lower spindle 2122 such that the buffer 2124 is disposed between the lower spindle 2122 and an inner surface 2125 of valve tube 2120. As such, the buffer 2124 and at least a portion of the lower spindle 2122 are each sealingly and slidingly engaged with the inner surface 2125 of valve tube 2120 such that the lower spindle 2122 and buffer 2124 can move axially along longitudinal axis L while also maintaining a fluid tight seal with the valve tube 120.

In the illustrated example, the valve actuating member 2141 is connected to the upper spindle 2132. In the illustrated example, the valve actuating member 2141 is a solenoid actuator (sometimes referred to as a power actuating member) that includes a linear actuating member 2143 that extends and retracts along longitudinal axis L. In the illustrated example, the linear actuating member 2143 is connected to the upper spindle 2132. As such, power actuating member 2141 causes an axial movement of the upper spindle 2132 and lower spindle 2122 to actuate valve 2100 into the open position or closed position. More specifically, when valve 2100 is in the open or unsealed position (i.e., seat disc 2126a is disengaged from valve seat 2116), deactivating or powering off the power actuating member 2141 causes a corresponding actuation of upper spindle 2132 and lower spindle 2122 such that the lower spindle 2122, buffer 2124, and seat disc 2126a axially move along longitudinal axis L towards the valve seat 2116 to actuate valve 2100 into the closed or sealed position (i.e., seat disc 2126a is sealingly engaged with valve seat 2116). Conversely, when valve 2100 is in the closed or sealed position, activating or powering on the power actuating member 2141 causes a corresponding actuation of upper spindle 2132 and lower spindle 2122 such that the lower spindle 2122, buffer 2124, and seat disc 2126a axially move along longitudinal axis L away from the valve seat 2116 to actuate valve 2100 into the open position. In the illustrated example, the sealing portion 2126 of the valve 2100 has a different shape than the sealing portion 126 of the valve 100. More specifically, when the seat disc 2126a and seat disc retainer 2126b are aligned with and attached to the sealing portion 2126 of the lower spindle 2122, the sealing portion 2126, the seat disc 2126a, and the seat disc retainer 2126b collectively define an orthogonal shape that corresponds with a shape of the valve seat 2116 such that when the valve 2100 is in the closed or sealed position (i.e., seat disc 2126a is sealingly engaged with valve seat 2116), cryogenic fluid flow between the second void 2112c and first void 2112b is blocked.

In the illustrated example, the general operation of valve 2100 is the same as the general operation of valve 100, except as discussed herein. It should therefore be appreciated that the disclosure related to valve 100 applies to valve 2100, except where such disclosure is inconsistent with the elements of valve 2100, as discussed herein.

FIGS. 20-35 depict another example shut-off valve 3000 for cryogenic fluids in accordance with the teachings herein. The valve 3000 may larger than the valves 100, 1100, 2100 and, thus, used for different applications compared to the valves 100, 1100, 2100. For example, the valves 100, 1100, 2100 may have a relatively smaller shut-off orifice (e.g., having a 15 mm diameter) and may be installed for relatively smaller tanks (e.g., vehicle tanks having a capacity of about 1000 liters of cryogenic fluid), while the valve 3000 may have a relatively larger shut-off orifice (e.g., having a diameter of between about 38 mm and 51 mm) and may be installed for relatively larger tanks (e.g., bulk tanks having a volume of between about 60-500 cubic meters).

Figure 20:
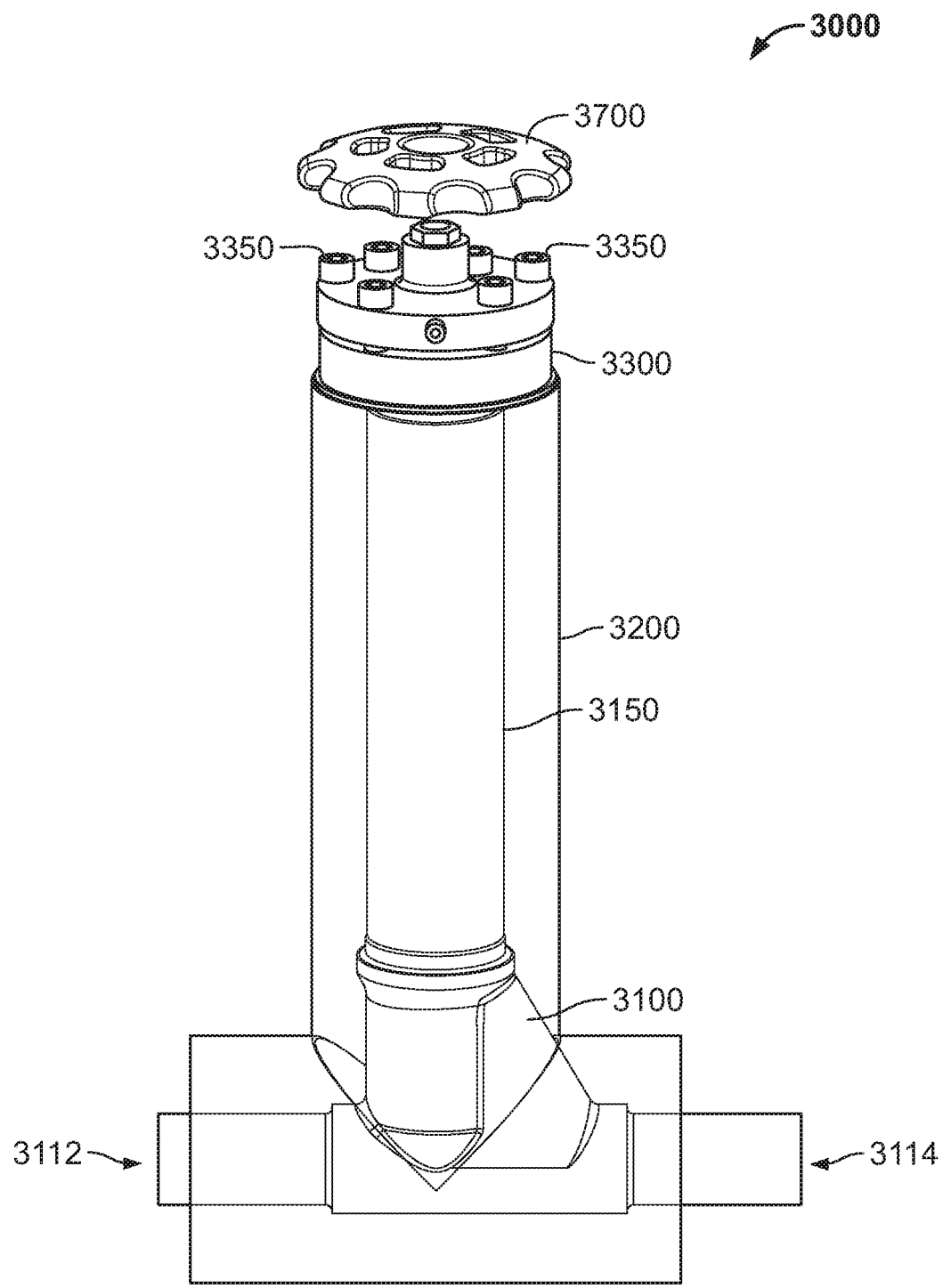
FIG. 20 depicts another cryogenic fluid shut-off valve in accordance with the teachings herein.
Figure 21:
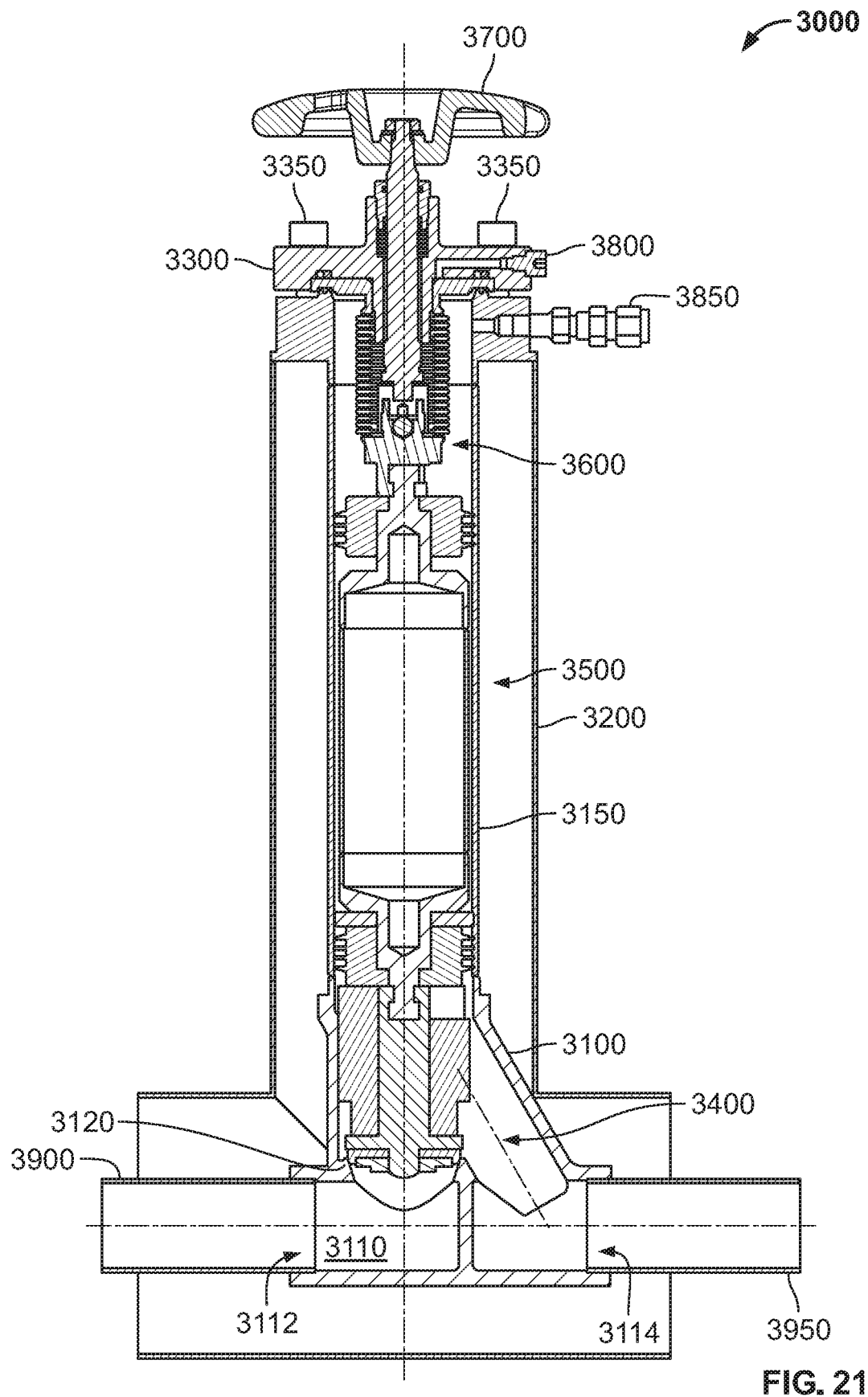
FIG. 21 depicts a cross-sectional side view of the cryogenic fluid shut-off valve of FIG. 20 with a plurality of sensors.

As shown in FIGS. 20 and 21, the valve 3000 of the illustrated example includes a valve body 3100, a bonnet 3150 (also referred to as a valve housing), an outer jacket 3200, a cover 3300, a plug 3400, a stem 3500, a spindle assembly 3600, and a rotating handle 3700. In some examples as shown in FIG. 21, valve 3000 also includes one or more sensors 3800, 3850.

The valve body 3100 and bonnet 3150 are formed of material, such as austenitic stainless steel, that is capable of withstanding extreme operating temperatures of cryogenic fluids (e.g., −270° C. to +85° C.). In the illustrated example, valve body 3100 and bonnet 3150 are securely coupled together via welding and/or other means. In other examples, valve body 3100 and bonnet 3150 are integrally formed together. The cover 3300 is securely coupled to an upper portion of valve body 3100 via one or more fasteners 3350. The valve body 3100 defines a flow path 3110 for cryogenic fluid, such as liquid hydrogen. The lower portion of valve body 3100 also defines an inlet 3112 and an outlet 3114 of the flow path 3110. The inlet 3112 securely receives and couples to (e.g., via welding, an interference fit, bonding, etc.) a fluid conduit 3900, and outlet 3114 securely receives and couples to (e.g., via welding, an interference fit, bonding, etc.) another fluid conduit 3950. An inner surface 3154 of bonnet 3150 defines a bonnet chamber 3162 that extends along a longitudinal axis of bonnet 3150 and connects to flow path 3110.

The outer jacket 3200 covers at least a portion of an outer surface 3102 of valve body 3100 and an outer surface 3152 of bonnet 3150 to provide insulation around the valve 3000 for the extremely cold temperatures of cryogenic fluid (e.g., about −270° C.) flowing through the valve body 3100. Further, outer jacket 3200 covers at least a portion of each of the fluid conduits 3900, 3950 to provide insulation around the fluid conduits 3900, 3950. In the illustrated example, outer jacket 3200 is a vacuum jacket that is securely connected (e.g., via welds) to cover valve body 3100, bonnet 3150, fluid conduit 3900, and/or fluid conduit 3950.

The plug 3400 is housed within valve body 3100 and/or bonnet 3150 and is configured to control the flow of cryogenic fluid through the inlet 3112 of valve body 3100. For example, valve body 3100 defines a valve seat 3120 located along the flow path 3110 at a position between inlet 3112 and outlet 3114. When plug 3400 sealingly engages valve seat 3120, as shown in FIG. 21, plug 3400 prevents cryogenic fluid from flowing through the flow path 3110 between inlet 3112 and outlet 3114. In contrast, when plug 3400 is disengaged from valve seat 3120, plug 3400 permits cryogenic fluid to flow from inlet 3112, through flow path 3110, and to outlet 3114. The position of plug 3400 is controlled manually by an operator rotating the rotating handle 3700, such as a rotating handle or a crank wheel, either clockwise or counterclockwise. For example, rotation of the rotating handle 3700 in a clockwise direction causes plug 3400 to move toward a closed position, and rotation of the rotating handle 3700 in a counterclockwise direction causes the plug 3400 to move toward a fully open position.

Figure 24:
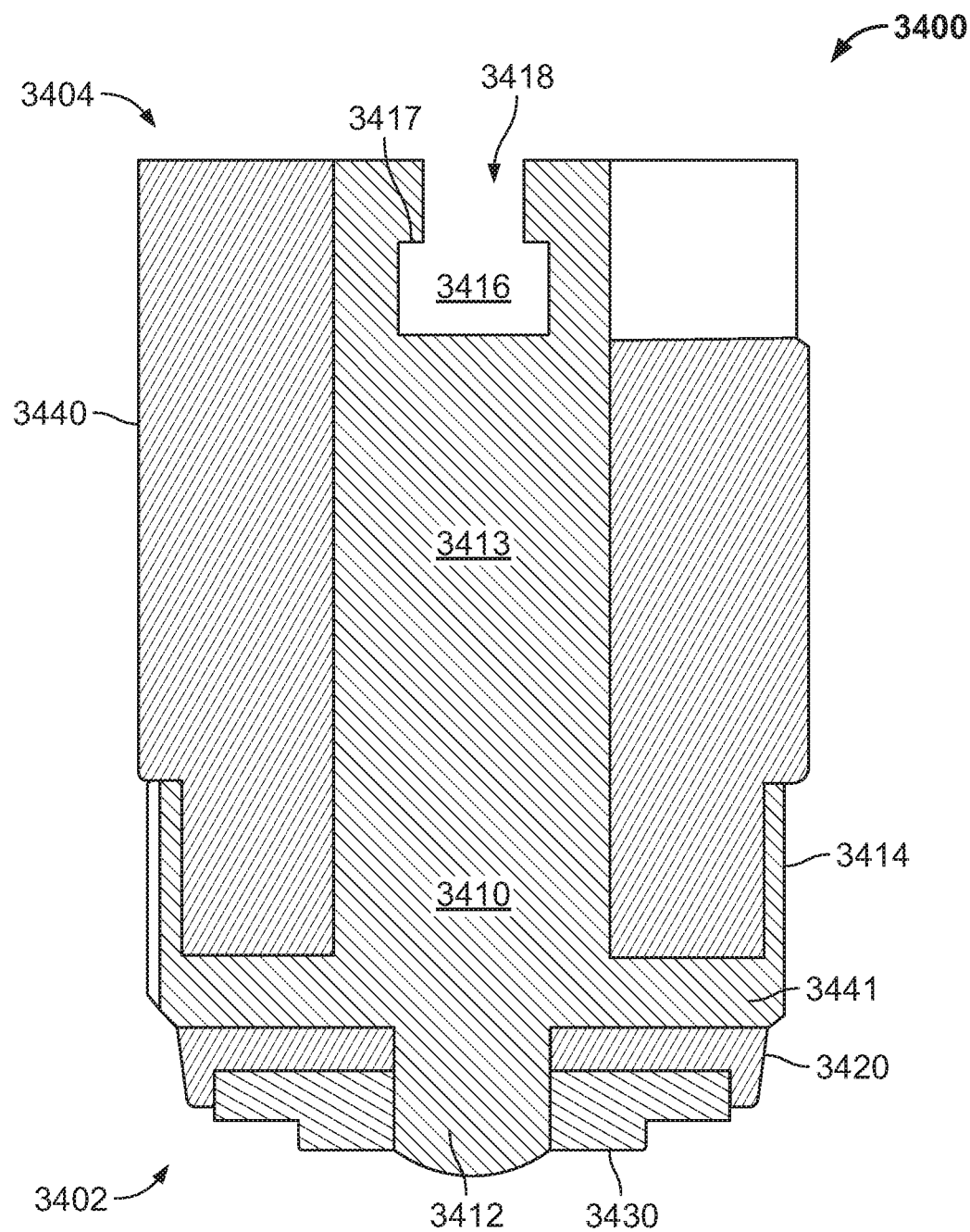
FIG. 24 is a cross-sectional side view of the plug of FIG. 22.

FIGS. 22-24 further depict the plug 3400 of the valve 3000. The plug 3400 includes a plug body 3410, a seal disc 3420, a disc retainer 3430, and a plug buffer 3440. As shown in FIG. 24, the plug body 3410 of the illustrated example includes a base plate 3441, a lower stem 3412, an upper stem 3413, and an outer collar 3414. The base plate 3441 extends radially outward from a longitudinal axis of the plug body 3410. The lower stem 3412 extends from the base plate 3441 in a downward direction along the longitudinal axis of the plug body 3410 to a lower end 3402 of the plug 3400. The upper stem 3413 extends from the base plate 3441 in an opposing upward direction along the longitudinal axis of the plug body 3410 to an upper end 3404 of the plug 3400. The outer collar 3414 extends from an outer edge of the base plate 3441 in the upward direction parallel to the longitudinal axis of the plug body 3410. As shown in FIGS. 22-23, an outer surface of the outer collar 3414 includes one or flats 3415 (e.g., six flats) that enable a tool to grip the plug body 3410 for assembly and/or installation of the plug 3400.

Figure 25:
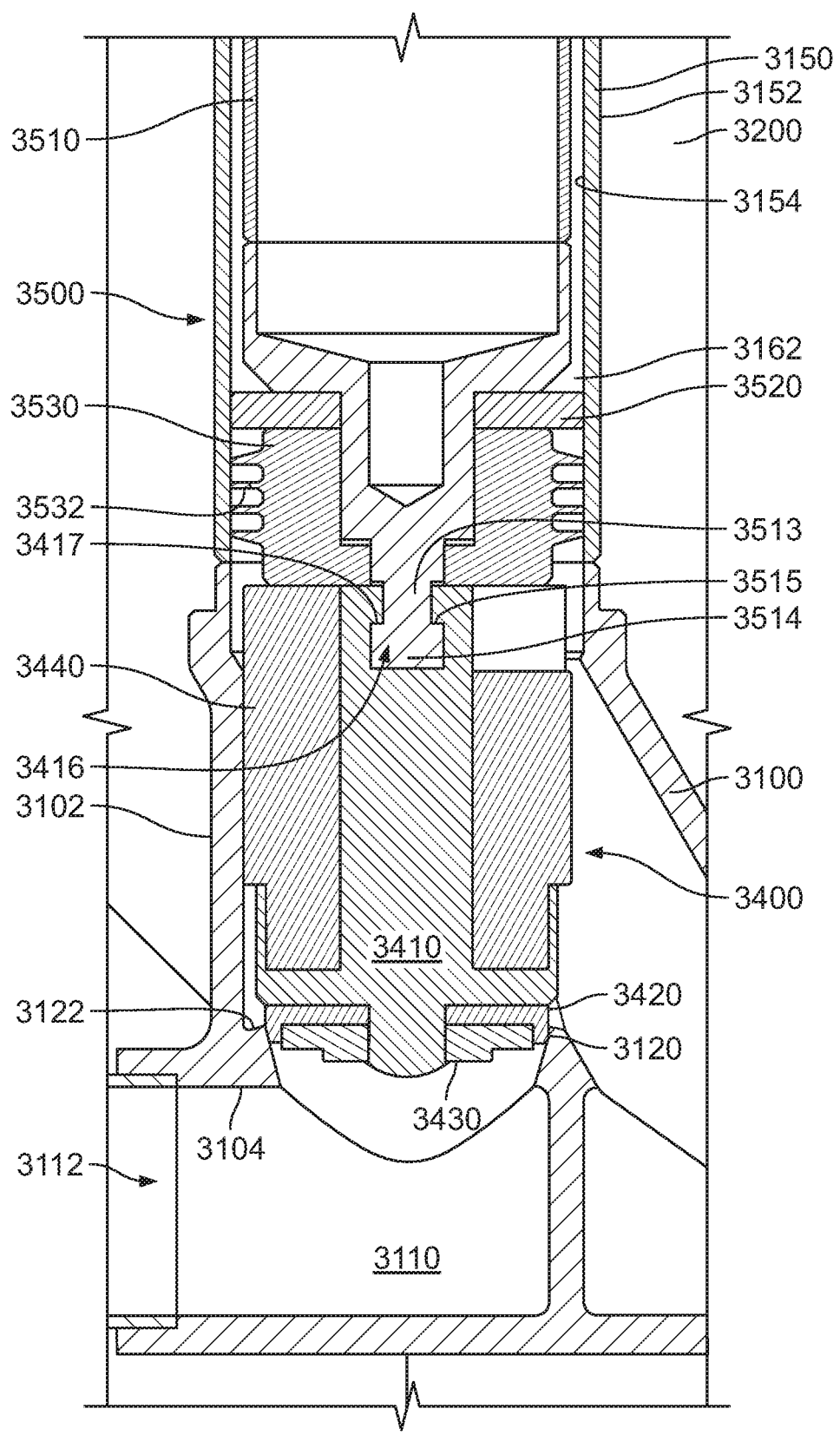
FIG. 25 is a cross-sectional side view of an expanded portion of the cryogenic fluid shut-off valve of FIG. 20 that depicts the plug operatively coupled to a stem assembly of the cryogenic fluid shut-off valve.

Returning to FIG. 24, the seal disc 3420 is bowl-shaped, and the disc retainer 3430 is ring-shaped. The seal disc 3420 is bowl-shaped to facilitate a sealed engagement to the valve seat 3120 that is conical-shaped. The seal disc 3420 is positioned such that (i) the lower stem 3412 extends through and engages the seal disc 3420 and (ii) the seal disc 3420 engages a lower surface of the base plate 3441. The disc retainer 3430 is positioned such that (i) the lower stem 3412 extends through and engages the disc retainer 3430 and (ii) the disc retainer 3430 engages a lower surface of the seal disc 3420. The disc retainer 3430 is fastened to the lower stem 3412 to securely retain the seal disc 3420 in position relative to the plug body 3410. For example, the seal disc 3420 is securely positioned between and engages the base plate 3441 and the disc retainer 3430 along the longitudinal axis of the plug 3400. The seal disc 3420 of the plug 3400 is configured to sealingly engage the valve seat 3120 when the plug 3400 is in a closed position. The seal disc 3420 is composed of a polymer material, such as polytetrafluoroethylene (PTFE), polychlorotrifluoroethylene (PCTFE), ultra-high-molecular-weight polyethylene (UHMWPE), TFM™ 1600 PTFE, etc., that is configured to withstand the extremely cold temperatures of cryogenic fluid. Further, as illustrated in FIG. 25, the valve body 3100 defines an inner groove 3122 adjacent the valve seat 3120 in which trapped particles may collect when the plug 3400 is sealingly coupled to the valve seat 3120 in the closed position.

Returning to FIGS. 23 and 24, the upper stem 3413 defines a chamber 3416 at the upper end 3404 of the plug 3400. The upper stem 3413 includes an inner lip 3417 that defines a portion of the chamber 3416. An upper surface of the upper stem 3413 defines an upper opening 3418 of the chamber 3416, and a circumferential surface of the upper stem 3413 defines a side opening 3419 of the chamber 3416.

The chamber 3416 of the upper stem 3413 is configured to couple the plug 3400 to the stem 3500. For example, to couple the plug 3400 to the stem 3500, a lower head 3514 at a lower end 3502 of the stem 3500 is slid into the chamber 3416 through the side opening 3419. When the plug 3400 is coupled to the stem 3500 as illustrated in FIG. 25, the chamber 3416 houses the lower head 3514 of the stem 3500 and a lower neck 3513 of the stem 3500 extends through the upper opening 3418 of the chamber 3416. The inner lip 3417 of the plug body 3410 engages a respective lip 3515 of the lower head 3514 of the stem 3500 to prevent the lower head 3514 from being pulled out of the chamber 3416 through the upper opening 3418.

As illustrated in FIGS. 22-24, the plug buffer 3440 has a hollow substantially-cylindrical shape. The plug buffer 3440 is positioned within the plug 3400 to encircle the upper stem 3413 of the plug 3400. The plug buffer 3440 is configured to extend from the upper end 3404 of the plug 3400 to a cylindrical groove formed between the base plate 3441, the upper stem 3413, and the outer collar 3414 of the plug 3400. For example, the plug buffer 3440 sealingly engages the an upper surface of the base plate 3441, an outer surface of the upper stem 3413, and an inner surface of the outer collar 3414 when positioned around the upper stem 3413. Additionally, the plug buffer 3440 defines a cutout to provide access to the side opening 3419 of the chamber 3416. The plug buffer 3440 is formed of a plastic material, such as polytetrafluoroethylene (PTFE), and/or other material that enables plug buffer 3440 to sealingly engage surfaces in extremely cold cryogenic temperatures.

As illustrated in FIG. 25, an outer surface of the plug buffer 3440 is configured to sealingly engage an inner surface 3104 of the valve body 3100 and/or the inner surface 3154 of the bonnet 3150 as the plug 3400 slides along a longitudinal axis of the bonnet 3150 between the closed position and a fully open position. The plug buffer 3440 is configured to (1) form a seal with the inner surface 3104 and/or the inner surface 3154 to deter cryogenic fluid from entering the bonnet 3150, (2) provide insulation for the bonnet 3150 from the extreme temperatures of the cryogenic fluid, and/or (3) reduce vibrations of the plug 3400 that may otherwise occur due to gas flow shock. Additionally, plug buffer 3440 collects particles and other such debris within valve 3000 to minimize contamination. In some examples, the plug buffer 3440 is formed of two semi-circular portions that are coupled together. In other examples, the plug buffer 3440 is single and monolithically formed piece that is slid into place.

Figure 26:
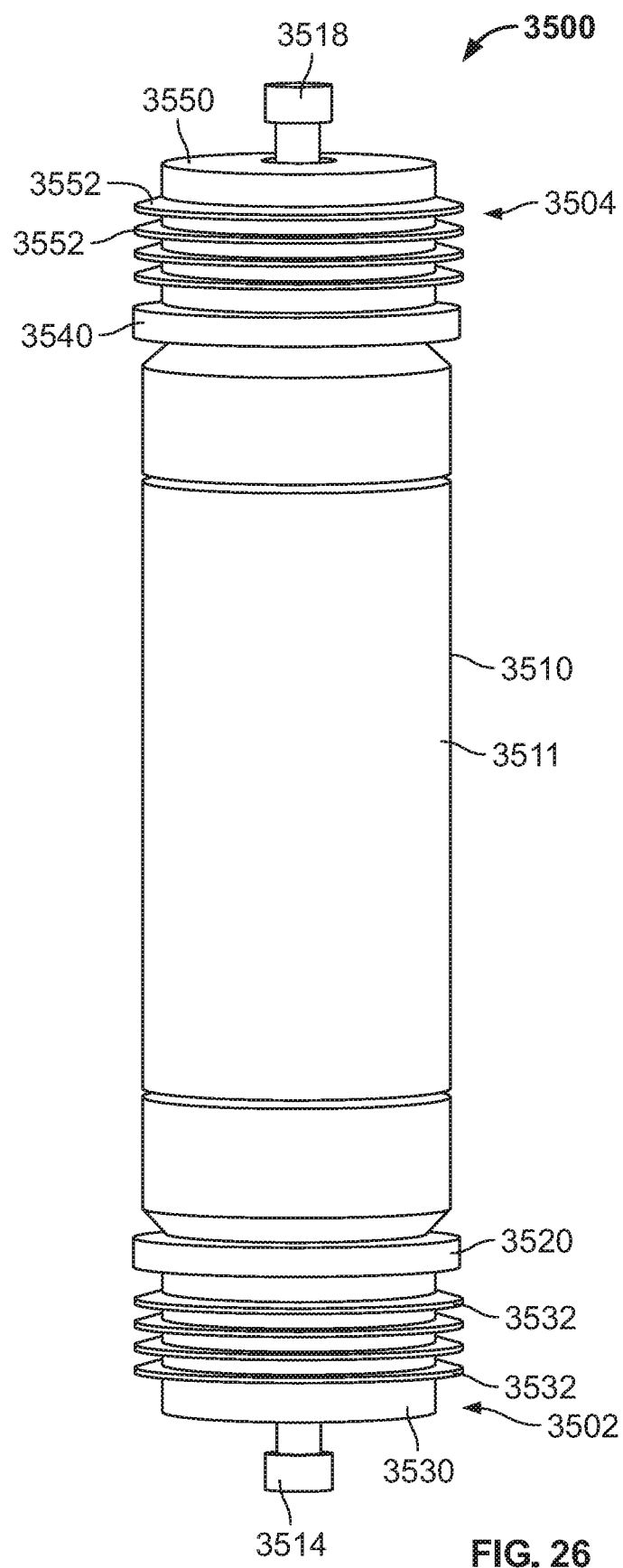
FIG. 26 depicts a stem assembly of the cryogenic fluid shut-off valve of FIG. 20.
Figure 27:
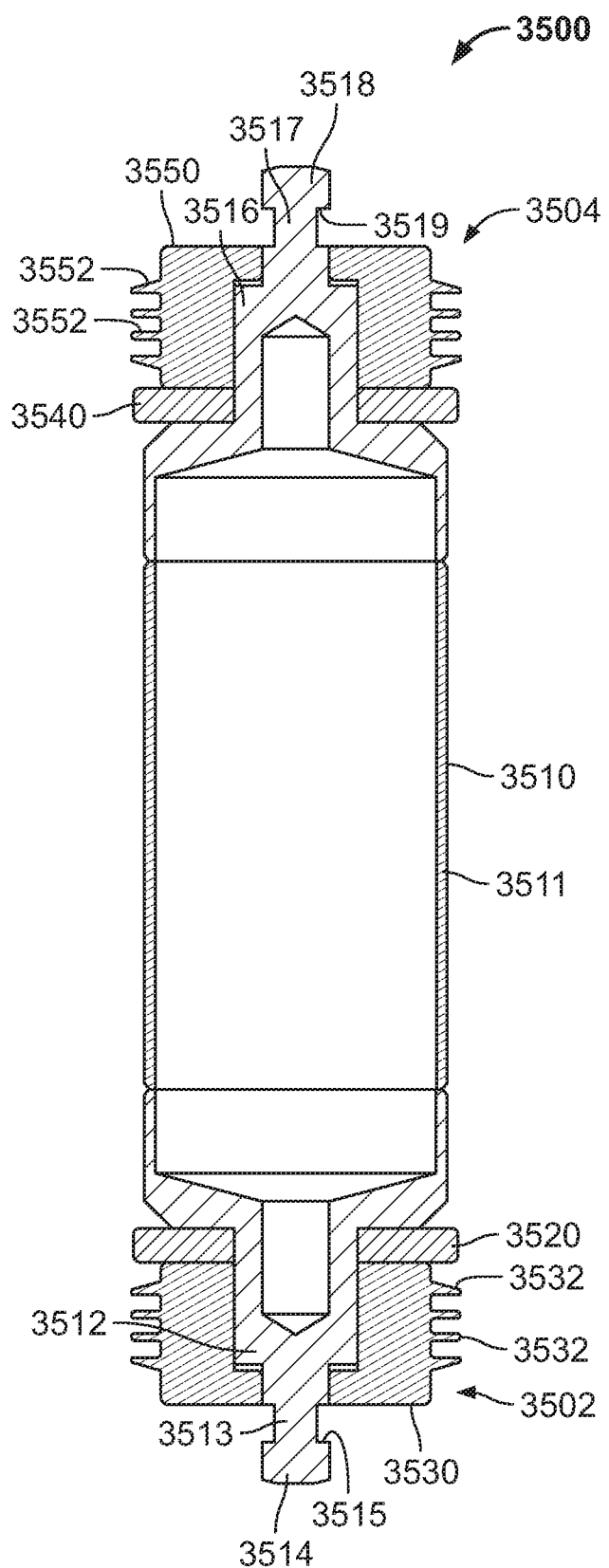
FIG. 27 is a cross-sectional side view of the stem assembly of FIG. 26.

The stem 3500 of the valve 3000 is housed within the bonnet 3150 of the valve 3000. As illustrated in FIGS. 26 and 27, the stem 3500 comprises an assembly including stem body 3510, a lower guide 3520, a lower stem buffer 3530, an upper guide 3540, and an upper stem buffer 3550. The stem body 3510 extends between the lower end 3502 and an upper end 3504 of the stem body 3510. The stem body 3510 includes a middle portion 3511, a lower extension 3512, and an upper extension 3516. In the illustrated example, the middle portion 3511 is hollow. The lower extension 3512 extends from the middle portion 3511 in a downward direction along a longitudinal axis of the stem 3500 to the lower end 3502 of the stem 3500. The upper extension 3516 extends from the middle portion 3511 in an upward direction along the longitudinal axis of the stem 3500 to the upper end 3504 of the stem 3500.

The lower neck 3513 extends from the lower extension 3512 in a downward direction along the longitudinal axis of the stem 3500, and the lower head 3514 extends from the lower neck 3513 in a downward direction along the longitudinal axis of the stem 3500. The lower head 3514 defines the lip 3515 adjacent the lower neck 3513 that is configured to engage the inner lip 3417 of the plug body 3410 when the stem 3500 is coupled to the plug 3400. Similarly, an upper neck 3517 extends from the upper extension 3516 in an upper direction along the longitudinal axis of the stem 3500, and an upper head 3518 extends from the upper neck 3517 in an upper direction along the longitudinal axis of the stem 3500. The upper head 3518 defines a lip 3519 adjacent the upper neck 3517. The lip 3519 is configured to engage a head 3617 of the spindle assembly 3600 to facilitate a secure coupling between the stem 3500 and the spindle assembly 3600.

As illustrated in FIGS. 26 and 27, each of the lower guide 3520 and the upper guide 3540 is ring shaped. The lower guide 3520 is positioned such that (i) the lower extension 3512 extends through and engages the lower guide 3520 and (ii) the lower guide 3520 engages a lower surface of the middle portion 3511 of the stem body 3510. The upper guide 3540 is positioned such that (i) the upper extension 3516 extends through and engages the upper guide 3540 and (ii) the upper guide 3540 engages an upper surface of the middle portion 3511 of the stem body 3510. The lower guide 3520 and the upper guide 3540 are configured to engage the inner surface 3154 of the bonnet 3150 to prevent the stem 3500 from tipping and, in turn, maintain alignment of the longitudinal axis of the stem 3500 with the longitudinal axis of the bonnet 3150. The lower guide 3520 and the upper guide 3540 are formed of a plastic material, such as polytetrafluoroethylene (PTFE), and/or other material that is able to withstand cryogenic temperatures and facilitate the lower guide 3520 and the upper guide 3540 to stabilize the stem 3500 as the stem 3500 slides within the bonnet 3150. For example, the lower guide 3520 and the upper guide 3540 are configured to slide along the inner surface 3154 of the bonnet 3150 as the stem 3500 slides axially along the longitudinal axis of the bonnet 3150 as the valve 3000 transitions between a closed state and a fully open state.

Each of the lower stem buffer 3530 and the upper stem buffer 3550 has a hollow substantially-cylindrical shape. The lower stem buffer 3530 is positioned such that (i) the lower extension 3512 extends through and engages the lower stem buffer 3530 and (ii) the lower stem buffer 3530 engages a lower surface of the lower guide 3520. For example, the lower stem buffer 3530 is fastened to the lower extension 3512 to securely retain the lower guide 3520 against the stem body 3510. The upper stem buffer 3550 is positioned such that (i) the upper extension 3516 extends through and engages the upper stem buffer 3550 and (ii) the upper stem buffer 3550 engages an upper surface of the upper guide 3540. For example, the upper stem buffer 3550 is fastened to the upper extension 3516 to securely retain the upper guide 3540 against the stem body 3510.

As shown in FIGS. 26 and 27, the lower stem buffer 3530 includes one or more ringed arms 3532. In the illustrated example, each of the ringed arms 3532 extend radially outward and extend circumferentially around the lower stem buffer 3530. The ringed arms 3532 are stacked and spaced apart from each other along a longitudinal axis of the lower stem buffer 3530. When stem 3500 is positioned within bonnet 3150 as shown in FIGS. 21 and 25, ringed arms 3532 engage the inner surface 3154 of bonnet 3150. The lower stem buffer 3530, including ringed arms 3532, is formed of a plastic material, such as polytetrafluoroethylene (PTFE), and/or other material that enables the ringed arms 3532 to formed a sealed connection with the inner surface 3154 of bonnet 3150 in extremely cold cryogenic temperatures. The ringed arms 3532 are configured to (1) form a seal to deter cryogenic fluid from entering the bonnet 3150 and/or (2) provide insulation for the bonnet 3150 from the extreme temperatures of the cryogenic fluid.

The upper stem buffer 3550 includes one or more ringed arms 3552. In the illustrated example, each of the ringed arms 3552 extend radially outward and extend circumferentially around upper stem buffer 3550. The ringed arms 3552 are stacked and spaced apart from each other along a longitudinal axis of the upper stem buffer 3550. When the stem 3500 is positioned within the bonnet 3150 as shown in FIG. 21, the ringed arms 3552 engage the inner surface 3154 of the bonnet 3150. The upper stem buffer 3550, including the ringed arms 3552, is formed of a plastic material, such as polytetrafluoroethylene (PTFE), and/or other material that enables the ringed arms 3552 to formed a sealed connection with the inner surface 3154 of bonnet 3150 in extremely cold cryogenic temperatures. The ringed arms 3552 are configured to (1) form a seal to deter cryogenic fluid from entering the bonnet 3150 and/or (2) provide insulation for the bonnet 3150 from the extreme temperatures of the cryogenic fluid.

Figure 28:
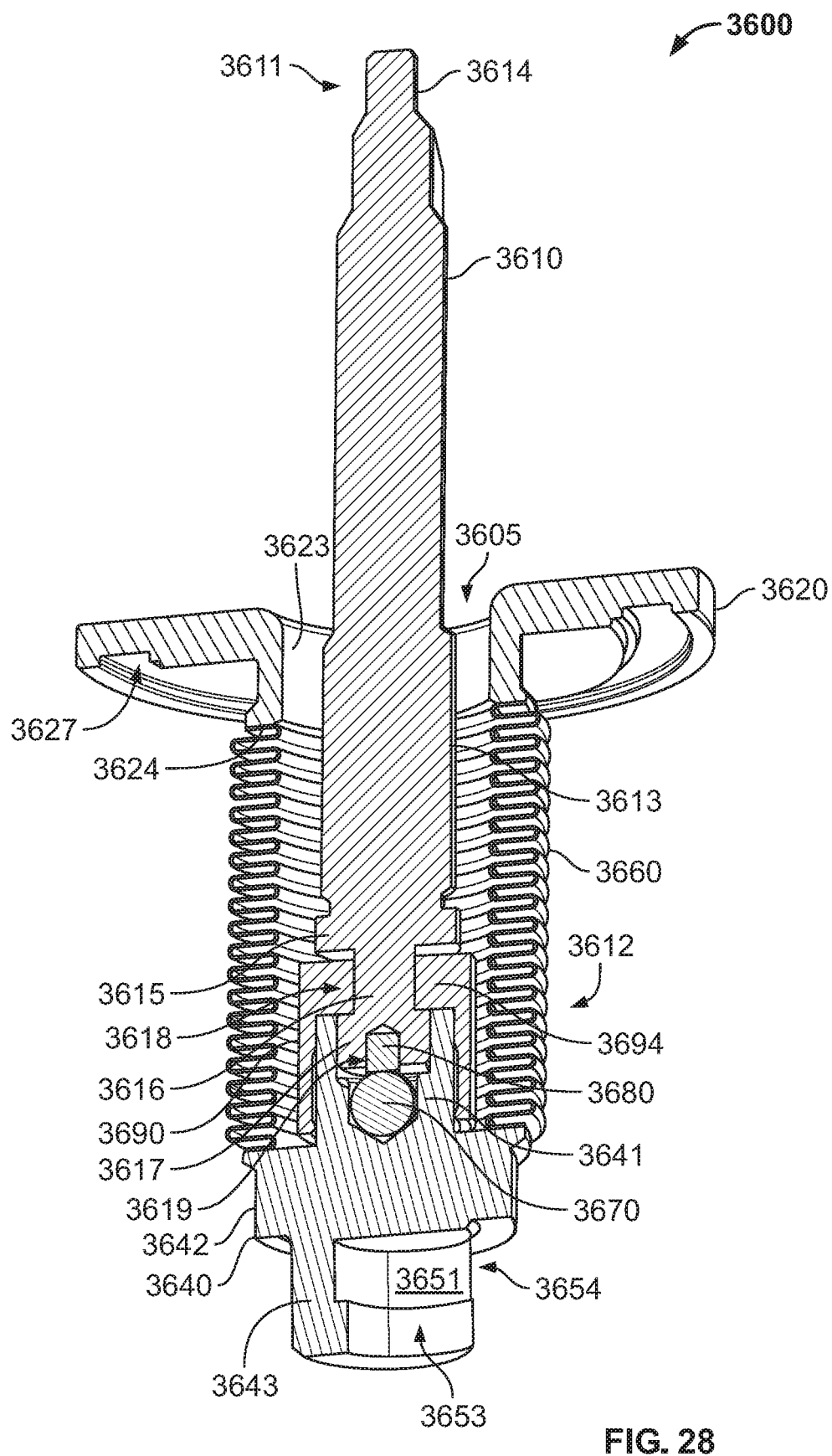
FIG. 28 is a cross-sectional perspective view of a spindle assembly of the cryogenic fluid shut-off valve of FIG. 20.
Figure 29:
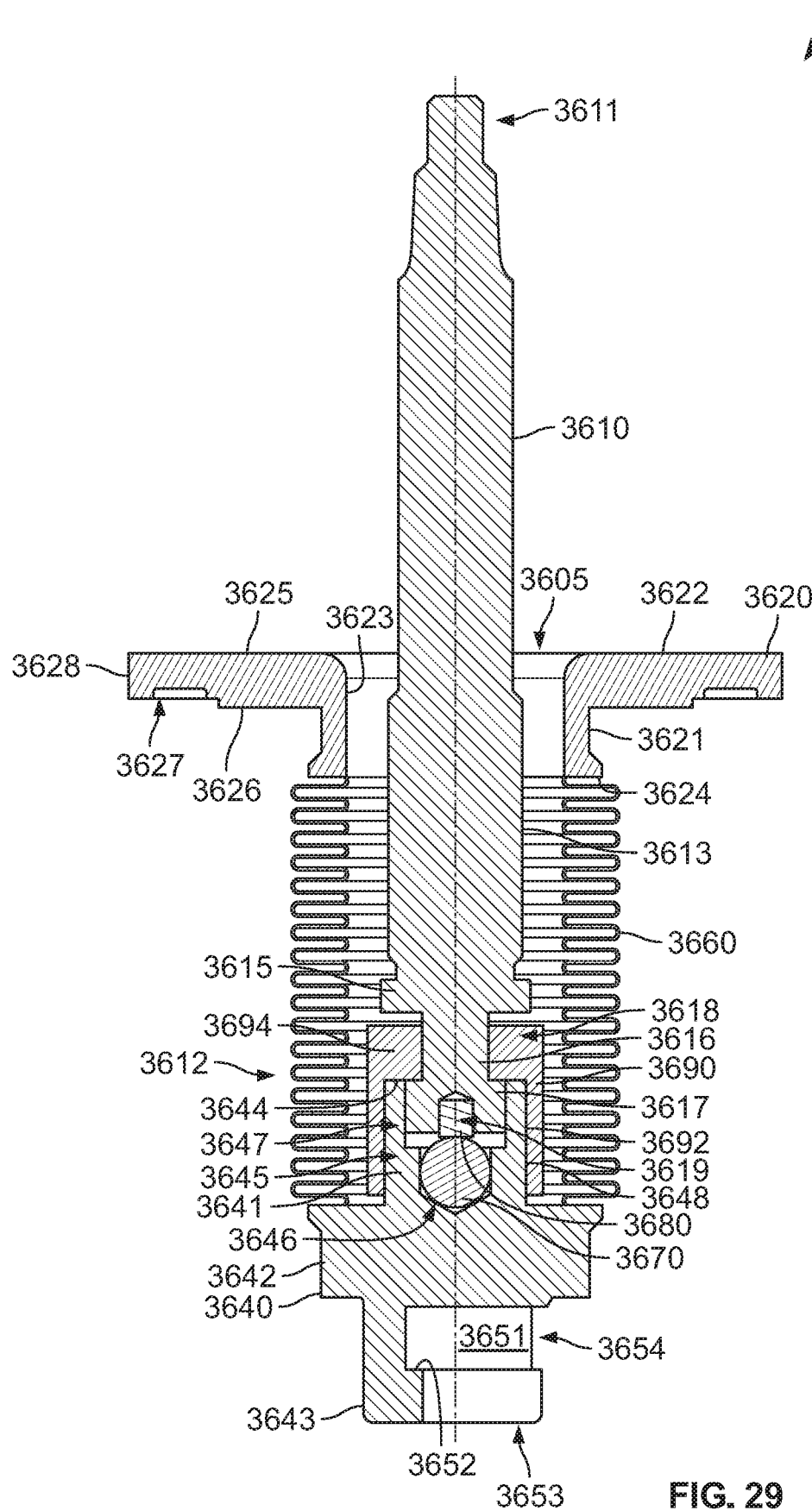
FIG. 29 is a cross-sectional side view of the spindle assembly of FIG. 28.

Turning to FIGS. 28 and 29, spindle assembly 3600 of the example valve 3000 includes a spindle 3610, an upper body 3620, a lower body 3640, a bellows 3660, a pivot ball 3670, a bumper block 3680, and a fastener 3690. The upper body 3620, lower body 3640, and bellows 3660 form a spindle housing. The spindle 3610 extends into an opening 3605 of the spindle housing that is defined by the upper body 3620 and bellows 3660. The spindle 3610 is physically and operatively coupled to lower body 3640 via pivot ball 3670, bumper block 3680, and fastener 3690.

The spindle 3610 includes an upper end 3611, a lower end 3612, and external threads 3613 located between the upper end 3611 and the lower end 3612. In the illustrated example, the upper end 3611 includes external threads 3614 that are configured to securely couple the spindle 3610 to the rotating handle 3700 outside of the bonnet 3150 of the valve 3000. The lower end 3612 of the spindle 3610 is configured to couple to the lower body 3640. The external threads 3613 are configured to be threadably received by first internal threads 3361 of the cover 3300 to enable the spindle 3610 to push or pull the plug 3400 between the closed position and the fully open position, respectively, as an operator rotates the rotating handle 3700.

In the illustrated example, the lower end 3612 includes a stopper 3615, a neck 3616 extending from the stopper, and a head 3617 extending from the neck 3616. In the illustrated example, the stopper 3615 is a flange that extends radially outward from the body of the spindle 3610. The stopper 3615 is adjacent the external threads 3613 of the spindle 3610 and has an outer diameter that is greater than other portions of the spindle 3610. The stopper 3615 extends farther radially outward than other portions of the spindle 3610 to enable the stopper 3615 to engage a lower surface 3322 of the cover 3300 and, in turn, limit how far the plug 3400 can be moved away from the valve seat 3120. Additionally, a groove 3618 that extends circumferentially around the neck 3616 is defined between the stopper 3615 and the head 3617, and a bore hole 3619 (also referred to as a "bumper bore hole") is defined by the head 3617. As disclosed below in greater detail, the groove 3618 and the bore hole 3619 enable the spindle 3610 to couple to the lower body 3640 of the spindle assembly 3600.

Figure 30:
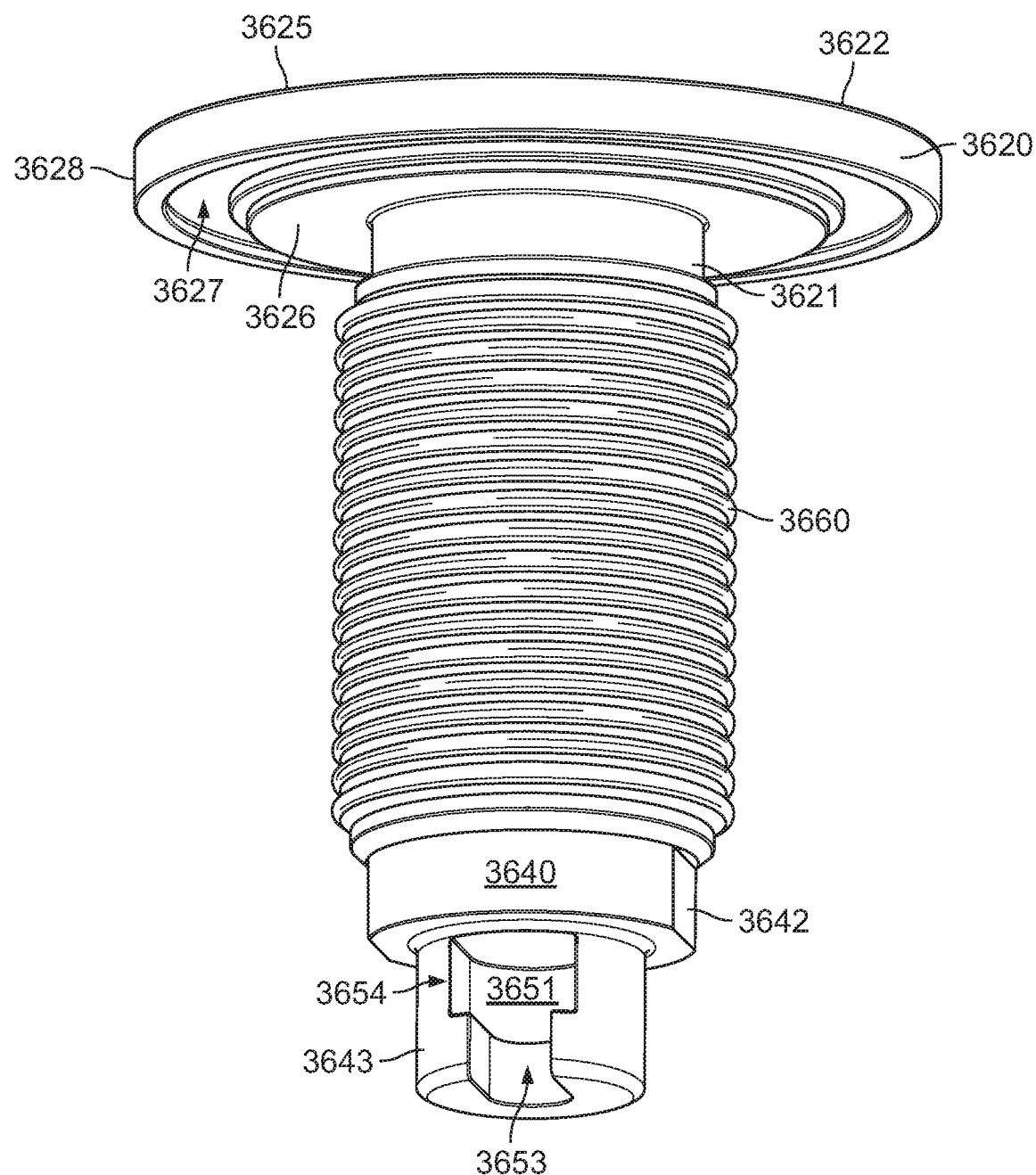
FIG. 30 is a perspective view of a bellows of the spindle assembly of FIG. 29.

As illustrated in FIGS. 28-30, the bellows 3660 extends between the upper body 3620 and the lower body 3640 of the spindle assembly 3600. The bellows 3660 is sealingly coupled to and extends between a bottom surface 3624 of the upper body 3620 and a seat 3644 of the lower body 3640. The bellows 3660 is formed of stainless steel and/or another relatively hard material that is capable of withstanding (e.g., with minimal deformation and/or shrinkage) the extremely cold temperatures of cryogenic fluid. In the illustrated example, the bellows 3660 is welded to the bottom surface 3624 of the upper body 3620 and the seat 3644 of the lower body 3640 to sealingly couple the bellows 3660 to the upper body 3620 and the lower body 3640, respectively. The bellows 3660 is sealingly coupled to the upper body 3620 and the lower body 3640 (e.g., with a reduced leakage rate of about $10^{-8}$ millibar L/s) to seal the external threads 3613 and other threads that facilitate movement of the plug 3400 from the cryogenic fluid, thereby reducing wear of the external threads 3613 and other threads over time. The bellows 3660 also is configured to flex to enable movement of the lower body 3640 relative to the upper body 3620. For example, the bellows 3660 is configured to expand and/or contract as the spindle 3610 causes the lower body 3640 to move away from and/or toward the upper body 3620, respectively.

As illustrated in FIGS. 28 and 29, the lower body 3640 includes an upper portion 3641, a middle portion 3642, and a lower portion 3643. The seat 3644 to which the bellows 3660 is coupled is defined by the middle portion 3642 adjacent the upper portion 3641.

The upper portion 3641 of the lower body 3640 defines a bore hole 3645 (also referred to as a "ball bore hole") having an inner chamber 3646 and an outer chamber 3647. Additionally, the upper portion 3641 defines external threads 3648. The upper portion 3641 of the lower body 3640 is configured to physically and operatively couple to the lower end 3612 of the spindle 3610. As shown in FIGS. 28 and 29, the pivot ball 3670 is positioned within the inner chamber 3646 of the bore hole 3645 of the lower body 3640. The bumper block 3680 is inserted into the bore hole 3619 of the head 3617 of the spindle 3610. The head 3617 and the bumper block 3680 are extended into the outer chamber 3647 of the bore hole 3645 of the lower body 3640 such that the bumper block 3680 engages the pivot ball 3670 within the bore hole 3645. The fastener 3690 includes inner threads 3692 and a flange 3694 that enable the fastener 3690 to securely couple the lower end 3612 of the spindle 3610 to the upper portion 3641 of the lower body 3640. The flange 3694 is configured to extend into the groove 3618 of the spindle 3610 and engage both the head 3617 of the spindle 3610 and the upper portion 3641 of the lower body 3640 to limit movement of the spindle 3610 relative to the lower body 3640 along the longitudinal axis of the bonnet 3150. The inner threads 3692 are configured to threadably engage the external threads 3648 of the lower body 3640 to securely fasten the spindle 3610 to the lower body 3640.

Figure 31:
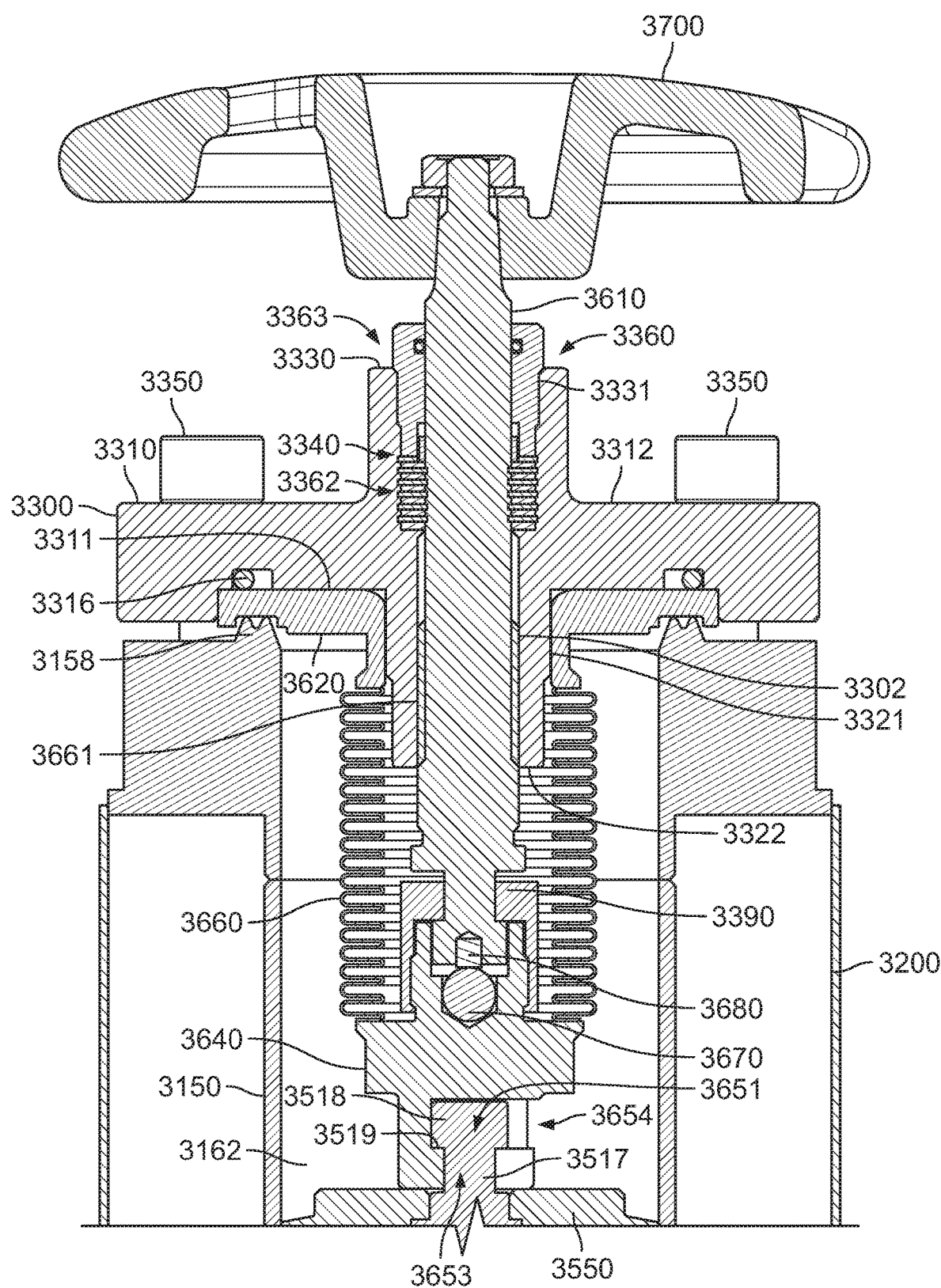
FIG. 31 is a cross-sectional side view of an expanded portion of the cryogenic fluid shut-off valve of FIG. 20 that depicts the spindle assembly of FIG. 28 operatively coupled to the stem assembly of FIG. 26 and a cover assembly of the cryogenic fluid shut-off valve.
Figure 32:
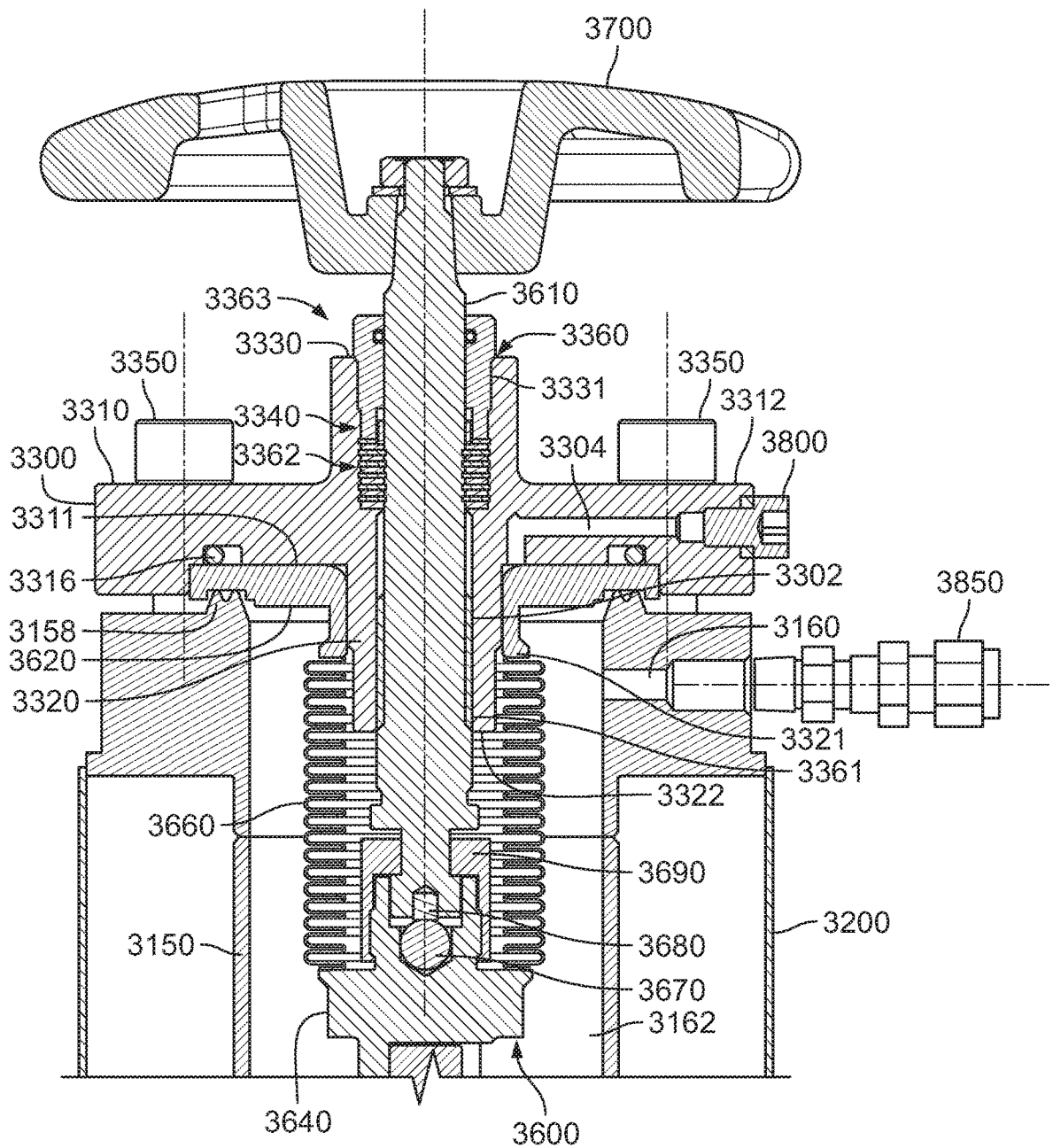
FIG. 32 is a cross-sectional side view of the expanded portion of FIG. 31 with the cryogenic fluid shut-off valve of FIG. 20 having a plurality of sensors.

The lower portion 3643 of the lower body 3640 defines a chamber 3651. The lower portion 3643 also includes an inner lip 3652 that defines a portion of the chamber 3651. A lower surface of the lower body 3640 defines a lower opening 3653 of the chamber 3651, and a circumferential surface of the lower body 3640 defines a side opening 3654 of the chamber 3651. The chamber 3651 is configured to couple the spindle assembly 3600 and the stem 3500 together. For example, to couple the upper end 3504 of the stem 3500 to lower body 3640 of the spindle assembly 3600, the upper head 3518 of the stem 3500 is slid into the chamber 3651 through the side opening 3654. When the stem 3500 is coupled to the spindle assembly 3600 as illustrated in FIGS. 31 and 32, the chamber 3651 houses the upper head 3518 of the stem 3500 and the upper neck 3517 of the stem 3500 extends through the lower opening 3653 of the chamber 3651. The inner lip 3652 of the lower body 3640 engages the lip 3519 of the upper head 3518 of the stem 3500 to prevent the upper head 3518 from being pulled out of the chamber 3651 through the lower opening 3653.

Returning to FIGS. 28-30, the upper body 3620 of spindle assembly 3600 includes a lower portion 3621, an upper flange 3622, and an inner surface 3623 defined by lower portion 3621 and upper flange 3622. The inner surface 3623 partially defines the opening 3605 of spindle assembly 3600. The lower portion 3621 defines the bottom surface 3624 that is configured to sealingly couple to bellows 3660. The upper flange 3622 extends radially outward relative to the lower portion 3621. The upper flange 3622 includes an upper surface 3625 and a lower surface 3626 opposite the upper surface 3625. In the illustrated example, the lower surface 3626 defines a groove 3627 adjacent an outer edge surface 3628 of the upper flange 3622.

Figure 33:
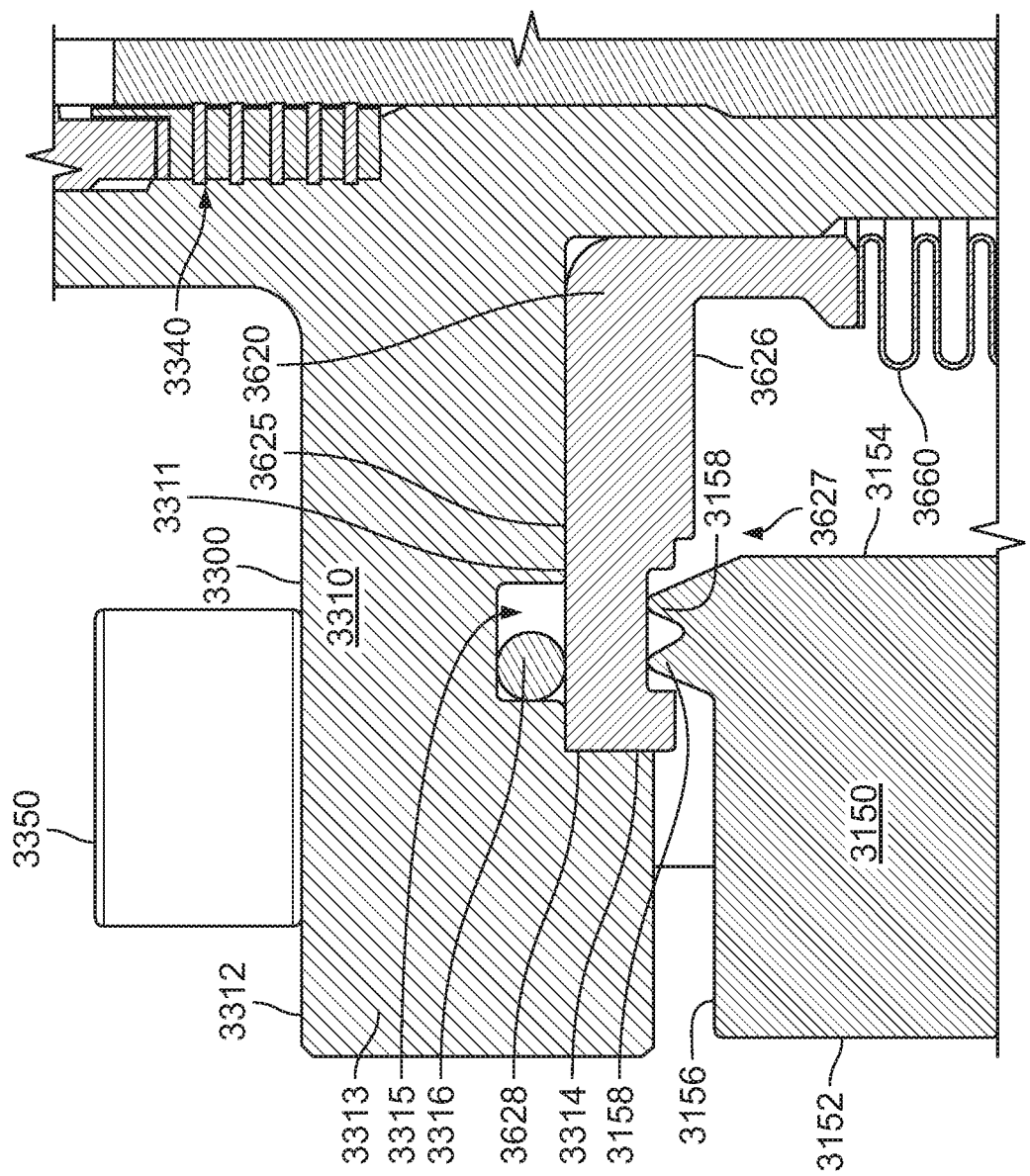
FIG. 33 is an expanded view of a portion of the cover assembly of FIGS. 31 and 32 and the spindle assembly of FIG. 28 coupled to a bonnet of the cryogenic fluid shut-off valve of FIG. 20.

As illustrated in FIGS. 31-33, the upper flange 3622 of upper body 3620 is configured to securely and sealingly couple spindle assembly 3600 to and between bonnet 3150 and cover 3300 of valve 3000. To couple the spindle assembly 3600 to bonnet 3150, the upper flange 3622 of upper body 3620 extends over and rests on a portion of an upper end 3156 of bonnet 3150. One or more concentric ribs 3158 extend from the upper end 3156 of bonnet 3150. In the illustrated example, bonnet 3150 includes two of the concentric ribs 3158. The lower surface 3626 of upper flange 3622 is configured to rest on and form a sealed connection with the concentric ribs 3158 of bonnet 3150. In the illustrated example, the concentric ribs 3158 are configured to extend into groove 3627 to facilitate alignment between spindle assembly 3600 and bonnet 3150.

In the illustrated example, the cover 3300 includes a plate 3310, lower portion 3320, an upper portion 3330, packing 3340, and the fasteners 3350. The cover 3300 has an inner surface 3302 that defines a through hole 3360 extending through the plate 3310, the lower portion 3320, and the upper portion 3330 along a center axis of the cover 3300. The plate 3310 and/or the lower portion 3320 of the plate 3310 include the first internal threads 3361 extending along the inner surface 3302. The spindle 3610 extends through the through hole 3360 of the cover 3300. The first internal threads 3361 are configured to threadably engage the external threads 3613 of the spindle 3610 to form a threaded coupling that enables the spindle 3610 to move along the longitudinal axis of the bonnet 3150 as the spindle 3610 is rotated via the rotating handle 3700.

The lower portion 3320 of the cover 3300 extends from a lower surface 3311 of the plate 3310 in a downward direction along the longitudinal axis of the bonnet 3150. The lower portion 3320 is configured to extend into the opening 3605 of the spindle assembly 3600. An outer surface 3321 of the lower portion 3320 engages the inner surface 3623 of the upper body 3620 of the spindle assembly 3600 when the lower portion 3320 is positioned to extend into the opening 3605. The lower portion 3320 includes the lower surface 3322 that is configured to engage the stopper 3615 of the spindle 3610 to limit movement of the spindle 3610 away from the valve body 3100 of the valve 3000.

The plate 3310 of the cover 3300 defines the lower surface 3311 and an upper surface 3312 opposite the lower surface 3311. The plate 3310 includes a flange 3313 along an outer edge. The flange 3313 of the illustrated example is downward facing and defines an inner lip 3314 adjacent the lower surface 3311 of the plate 3310. The lower surface 3311 defines a circumferential groove 3315 adjacent the flange 3313. A seal 3316 (e.g., an O-ring) is housed within the circumferential groove 3315 when the valve 3000 is assembled together. As shown in FIGS. 31-33, the plate 3310 is configured to engage the upper flange 3622 of the upper body 3620 of the spindle assembly 3600. The lower surface 3311 of the plate 3310 engages the upper surface 3625 of the upper flange 3622, and the inner lip 3314 of the plate 3310 engages the outer edge surface 3628 of the upper flange 3622. The seal 3316 disposed within the circumferential groove 3315 sealingly engages the lower surface 3311 of the plate 3310 and the upper surface 3625 of the upper flange 3622 to form a sealed connection between the plate 3310 and the upper flange 3622 and, in turn, prevent moisture, dirt, and/or other material from entering into the valve 3000. The plate 3310 also defines through holes that are configured to align with bore holes (e.g., threaded bore holes) defined by the upper end 3156 of the bonnet 3150. The fasteners 3350 are configured to extend through the through holes of the plate 3310 and be received (e.g., threadably) by the bore holes of the bonnet 3150 to securely fasten the cover 3300 to the bonnet 3150. When the cover 3300 is secured to the bonnet 3150, the upper flange 3622 of the spindle assembly 3600 is pinned in place between the cover 3300 and the bonnet 3150.

The upper portion 3330 of cover 3300 defines a counterbore 3362 of the through hole 3360 adjacent the first internal threads 3361 of cover 3300. The upper portion 3330 also includes second internal threads 3331 that extend along the inner surface 3302 and around a portion of counterbore 3362 adjacent an upper opening 3363 of through hole 3360. As illustrated in FIGS. 31 and 32, counterbore 3362 is configured to house the packing 3340, which is positioned radially between and sealingly engages inner surface 3302 of cover 3300 and spindle 3610.

Figure 35:
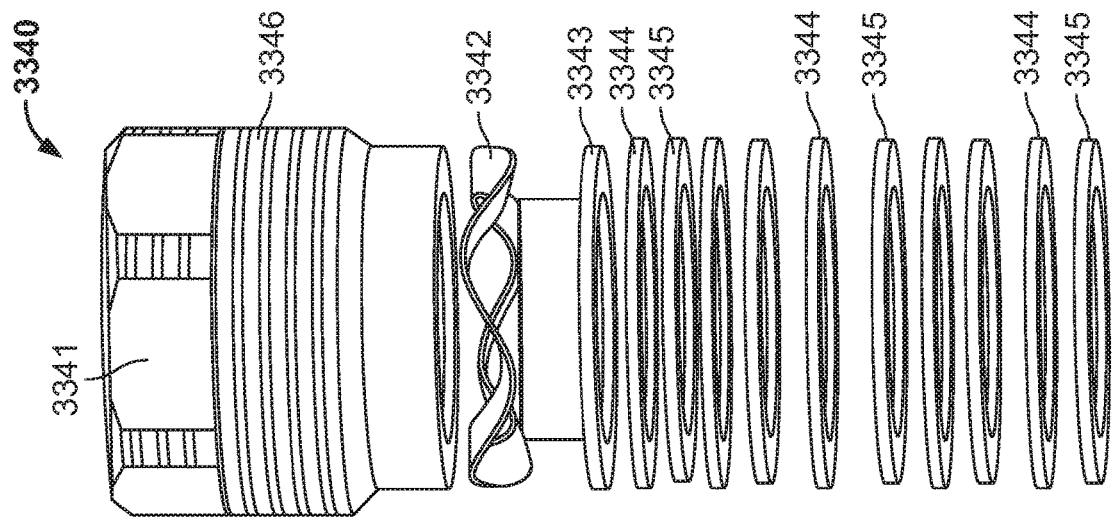
FIG. 35 is an exploded perspective view of the packing assembly of FIG. 34.
Figure 34:
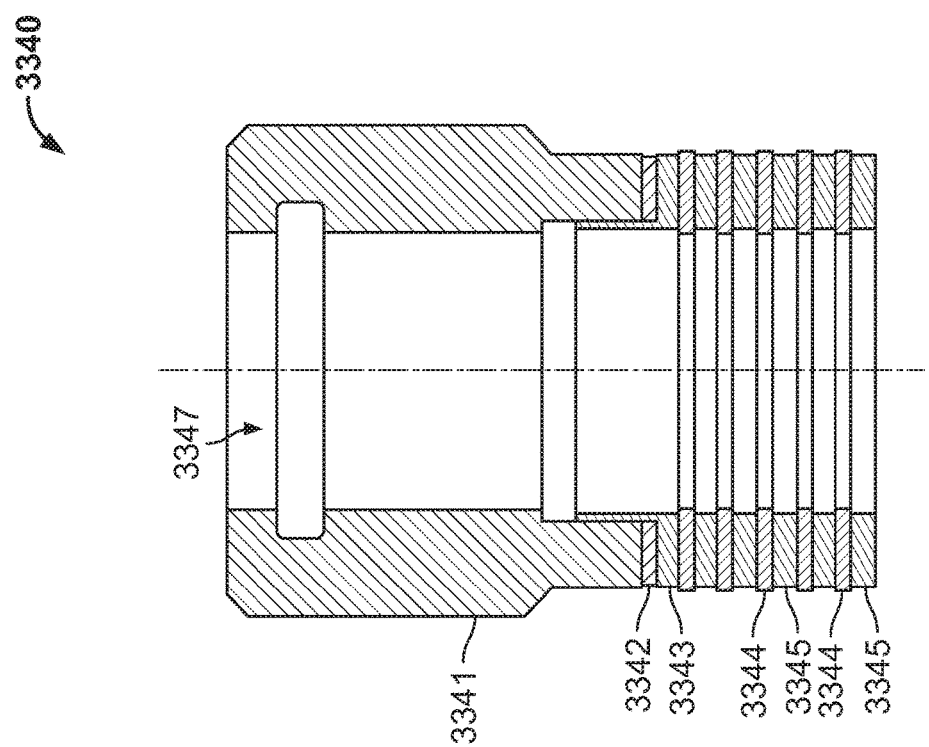
FIG. 34 is a cross-sectional side view of a packing assembly of the cover assembly of FIGS. 31 and 32.

As illustrated in FIGS. 34 and 35, the packing 3340 includes a nut 3341 (e.g., a gland nut), a wave spring 3342, a support 3343, one or more seals 3344, and one or more separators 3345. In the illustrated example, the seals 3344 include five seals and the separators 3345 include five separators. In other examples, there may be more or less of the seals 3344 and/or the separators 3345. The seals 3344 are composed of a sealing material, such as PTFE, PCTFE, etc., that is capable of withstanding cryogenic temperatures. The nut 3341, wave spring 3342, support 3343, and separators 3345 are composed of a metallic material, such as stainless steel, that is capable of withstanding cryogenic temperatures.

To assemble the packing 3340 within the counterbore 3362, the separators 3345 and the seals 3344 are arranged within the counterbore 3362 in an alternating manner along a center axis of the counterbore 3362. The support 3343 is placed within the counterbore 3362 and is configured to engage an outermost one of the seals 3344. The wave spring 3342 is placed on top of and engages the support 3343. The nut 3341 includes external threads 3346 that are configured to be threadably received by the second internal threads 3331 of the cover 3300 to tighten the packing 3340 together within the counterbore 3362. Returning to FIGS. 31 and 32, the packing 3340 defines a through hole 3347 through which a portion of the spindle 3610 is configured to slidably extend. The packing 3340 is configured to form a sealed connection between the spindle 3610 and the cover 3300 to further insulate the surrounding area from the cryogenic fluid and/or cryogenic temperatures of the cryogenic fluid.

In some examples as shown in FIGS. 21 and 32, the valve 3000 includes the sensor 3800 and/or the sensor 3850. The sensor 3800 is a leakage sensor and is configured to be inserted at least partially into an inspection hole 3304 defined by the plate 3310 of the cover 3300. The inspection hole 3304 extends to a portion of the lower surface 3311 of the plate 3310 between the lower portion 3320 and the circumferential groove 3315. When the valve 3000 is assembled together, the sensor 3800 is configured to be received (e.g., threadably) by the inspection hole 3304 to detect whether the bellows 3660 has a leak that is permitting cryogenic fluid to reach the lower surface 3311 of the plate 3310 of the cover 3300. Further, in the illustrated example, the sensor 3850 is a pressure sensor or gauge that is configured to be inserted at least partially into a purge hole 3160 defined by the bonnet 3150. The purge hole 3160 extends between the outer surface 3152 and the inner surface 3154 of the bonnet 3150, for example, to enable air to be purged from the bonnet chamber 3162 of the bonnet 3150 after the valve 3000 has been assembled. When the valve 3000 has been assembled together, the sensor 3850 is configured to be received (e.g., threadably) by the purge hole 3160 to detect an air pressure within the bonnet chamber 3162 of the bonnet 3150 during operation.

In operation, an operator rotates the rotating handle 3700 about the longitudinal axis of bonnet 3150 which, in turn, causes spindle 3610 to rotate about the longitudinal axis of bonnet 3150. The threaded coupling formed between the external threads 3613 of spindle 3610 and the internal threads 3361 of cover 3300 causes spindle 3610 to move vertically along the longitudinal axis of bonnet 3150 as the spindle 3610 is rotated via rotating handle 3700. The pivot ball 3670 and bumper block 3680 of spindle assembly 3600 translate linear and rotational movement of spindle 3610 into linear movement of lower body 3640 of spindle assembly 3600. Additionally, the coupling between lower body 3640 of spindle assembly 3600 and stem 3500 causes stem 3500 to slide along the longitudinal axis of bonnet 3150 as lower body 3640 of spindle assembly 3600 slides along the longitudinal axis. The coupling between stem 3500 and plug 3400 causes plug 3400 to slide relative to valve seat 3120 between the closed position and the fully open position as stem 3500 slides along the longitudinal axis of bonnet 3150. In turn, the arrangement of plug 3400, stem 3500, spindle assembly 3600, and rotating handle 3700 enables plug 340 to (1) close the flow path 3110 for the cryogenic fluid when rotating handle 3700 is rotated in a first rotational direction and (2) open the flow path 3110 for the cryogenic fluid when rotating handle 3700 is rotated in a second opposing rotational direction.

The arrangement of pivot ball 3670, bumper block 3680, and bellows 3660 of spindle assembly 3600 is configured to extend the operating life of a number of components of valve 3000. The bellows 3660 is positioned around spindle 3610 and is configured to flex as the lower body 3640 of spindle assembly 3600 slides relative to upper body 3620 of spindle assembly 3600 to retain a seal around spindle 3610. The seal formed by bellows 3660 is configured to fluidly isolate the threaded coupling between external threads 3613 and internal threads 3361 from the cryogenic fluid flowing through valve 3000, thereby extending the operational life of spindle 3610 and cover 3300. The pivot ball 3670 and bumper block 3680 translates the linear and rotational movement of spindle 3610 into the linear movement of stem 3500 and plug 3400 to eliminate and/or otherwise reduce rotational movement of the plug buffer 3440, the lower stem buffer 3530, and the upper stem buffer 3550. Such reduction of rotational movement reduces friction between the inner surface 3154 of bonnet 3150 and plug buffer 3440, lower stem buffer 3530, and upper stem buffer 3550, thereby (1) reducing the force that is needed to be applied to rotating handle 3700 to open and close valve 3000 and (2) extending the operational life of plug buffer 3440, lower stem buffer 3530, and upper stem buffer 3550.

Additionally, valve 3000 is configured so that components of valve 3000 can be serviced and/or replaced without having to disconnect valve body 3100 from the fluid conduits 3900, 3950, which may be welded to valve body 3100. For example, plug 3400, stem 3500, and spindle assembly 3600 are configured to be removed through the upper end 3156 of bonnet 3150 for servicing and/or replacement without having to disconnect valve body 3100 from the fluid conduits 3900, 3950, thereby reducing maintenance costs of the valve 3000.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

In various embodiments, a shut-off valve for use with cryogenic fluids comprises a body including a valve inlet, a valve outlet, and one or more internal surfaces that define at least one void in fluid communication with the valve inlet and the valve outlet, a valve seat defined by the one or more internal surfaces of the body, a housing connected to the body, a valve spindle disposed within the housing, the valve spindle including a seat disc configured to sealingly engage with the valve seat, a buffer composed of a cryogenic temperature resistant material circumferentially surrounding and fixedly connected to at least a portion of the valve spindle and slidingly engaged with an internal surface of the housing, and a valve actuating member operatively connected to the valve spindle, the valve actuating member configured to cause an axial movement of the valve spindle, the valve seat, and the buffer to control a flow of a fluid from the valve inlet into the at least one void and the valve outlet.

In one such embodiment, the buffer is composed of polytetrafluoroethylene.

In another such embodiment, the buffer comprises a first semi-circular portion joined to a second semi-circular portion.

In another such embodiment, the buffer comprises a plurality of outer surfaces that define a notch around a first circumference of a first portion of the buffer and a buffer collar around a second circumference of a second portion of the buffer opposite the first portion.

In another such embodiment, the valve spindle comprises an upper spindle and a lower spindle, and wherein the lower spindle comprises a spindle collar that extends into the notch of the buffer to align and position the buffer around the lower spindle.

In another such embodiment, the valve spindle comprises a spindle collar that extends into the notch of the buffer to align and position the buffer around the valve spindle.

In another such embodiment, the buffer comprises a buffer assembly comprising a plurality of buffer members, and wherein each buffer member of the plurality of buffer members comprise a plurality of outer surfaces that define a notch around a first circumference of a first portion of the buffer member and a buffer collar around a second circumference of a second portion of the buffer member opposite the first portion.

In another such embodiment, the valve spindle comprises a spindle collar that extends into a first notch of a first buffer member of the plurality of buffer members and a first buffer collar of the first buffer member of the plurality of buffer members extends into a second notch of a second buffer member of the plurality of buffer members.

In another such embodiment, the valve spindle comprises an upper spindle and a lower spindle, the lower spindle comprises an upper spindle engagement member and the upper spindle comprises a lower spindle engagement member operatively engaged with the upper spindle engagement member such that rotation of the upper spindle causes rotation of the lower spindle.

In another such embodiment, the upper spindle engagement member comprises multiple upper spindle engaging surfaces that define an upper spindle receiving bore, and wherein the lower spindle engagement member comprises multiple lower spindle engaging surfaces that correspond to and slidingly engage with the upper spindle engaging surfaces.

In another such embodiment, the valve actuating member comprises a power actuating member comprising a linear actuating member operatively connected to the valve spindle such that activation of the power actuating member causes a first axial movement of the valve spindle in a first direction such that the valve spindle, the buffer, and the seat disc move axially along a longitudinal axis away from the valve seat to actuate the shut-off valve into an unsealed position, and wherein deactivation of the power actuating member causes a second axial movement of the valve spindle in a second direction such that the valve spindle, the buffer, and the seat disc move axially along the longitudinal axis towards the valve seat to actuate the shut-off valve into a sealed position.

In another such embodiment, the valve actuating member comprises a solenoid.

In another such embodiment, the shut-off valve further comprises a vacuum jacket that encloses the body and at least a portion of the housing.

In another such embodiment, the housing comprises a valve tube connected to a valve stem, and wherein the buffer is slidingly engaged to an internal surface of the valve tube.

In another such embodiment, at least a portion of the valve spindle is slidingly engaged to the internal surface of the valve tube.

In another such embodiment, the shut-off valve further comprises an O-ring disposed in a groove circumferentially formed around an outer surface of the valve spindle, wherein the O-ring sealingly engages the internal surface of the housing.

In various embodiments, a shut-off valve for use with cryogenic fluid comprises a valve body defining a flow path, an inlet of the flow path, an outlet of the flow path, and a valve seat located along the flow path between the inlet and the outlet. The shut-off valve comprises a bonnet coupled to the valve body and defining a bonnet chamber that extends along a longitudinal axis of the bonnet and connects to the flow path, a plug configured to slide along the longitudinal axis of the bonnet between a closed position at which the plug sealingly engages the valve seat and an open position at which the plug is disengaged from the valve seat, and a stem coupled to the plug and housed within the bonnet chamber of the bonnet. The stem is configured to slide along the longitudinal axis of the bonnet to cause the plug to slide between the open position and the closed position. The shut-off valve comprises a spindle comprising external threads and operatively coupled to the stem. The spindle is configured to move along the longitudinal axis of the bonnet as the spindle is rotated via the external threads about the longitudinal axis to cause the stem to slide linearly along the longitudinal axis. The shut-off valve comprises a pivot ball positioned between and operatively coupled to the stem and the spindle. The pivot ball is configured to translate linear and rotational movement of the spindle into linear movement of the stem and the plug.

One such embodiment further comprises a cover for the bonnet chamber. The cover comprises an inner surface that defines a through hole through which the spindle extends.

In another such embodiment, the cover comprises internal threads extending along the inner surface. The internal threads are configured to form a threaded coupling with the external threads of the spindle. The threaded coupling causes the spindle to move along the longitudinal axis of the bonnet as the spindle is rotated about the longitudinal axis.

Another such embodiment further comprises packing housed within a counterbore of the through hole of the cover. The packing is positioned radially between and sealingly engages the inner surface of the cover and the spindle. The packing comprises a set of alternating separators and seals.

Another such embodiment further comprises a leakage sensor configured to detect a leakage of the cryogenic fluid adjacent the cover.

Another such embodiment further comprises a pressure sensor configured to detect an air pressure within the bonnet chamber of the bonnet during operation.

Another such embodiment further comprising a spindle assembly that comprises the spindle and a lower body coupled to the stem.

In another such embodiment, the lower body defines a ball bore hole in which the pivot ball is positioned. The spindle includes a head that extends into the ball bore hole.

In another such embodiment, the head of the spindle defines a bumper bore hole. The spindle assembly further comprises a bumper block positioned in the bumper bore hole. The bumper block engages the pivot ball within the ball bore hole to enable the pivot ball to translate the linear and rotational movement of the spindle into the linear movement of the stem.

In another such embodiment, the spindle assembly further comprises an upper body that is secured to the bonnet.

In another such embodiment, the spindle assembly further comprises a bellows that extends between the lower body and the upper body. The upper body and the bellows defines an opening into which the spindle extends to reach the lower body. The bellows is sealingly coupled to the lower body and the upper body to fluidly isolate the external threads of the spindle from the cryogenic fluid.

In another such embodiment, the spindle is configured to move the lower body relative to the upper body along the longitudinal axis of the bonnet. The bellows is configured to flex as the lower body moves relative to the upper body.

In another such embodiment, the plug includes a plug buffer configured to sealingly engage an inner surface of the bonnet that defines the bonnet chamber.

In another such embodiment, the stem includes a lower buffer at a lower end of the stem and an upper buffer at an upper end of the stem. Each of the lower buffer and the upper buffer includes ringed arms that are stacked and spaced apart from each other along an axis of the stem. The ringed arms are configured to sealingly engage an inner surface of the bonnet that defines the bonnet chamber.

Another such embodiment further comprises one or more buffers of at least one of the plug or the stem. The one or more buffers is configured to sealingly engage and slide linearly along an inner surface of the bonnet that defines the bonnet chamber.

What is claimed is:

1. A shut-off valve for use with cryogenic fluid, the shut-off valve comprising:
    a valve body defining a flow path, an inlet of the flow path, an outlet of the flow path, and a valve seat located along the flow path between the inlet and the outlet;
    a bonnet coupled to the valve body and defining a bonnet chamber that extends along a longitudinal axis of the bonnet and connects to the flow path;
    a plug configured to slide along the longitudinal axis of the bonnet between a closed position at which the plug sealingly engages the valve seat and an open position at which the plug is disengaged from the valve seat;
    a stem coupled to the plug and housed within the bonnet chamber of the bonnet, wherein the stem is configured to slide along the longitudinal axis of the bonnet to cause the plug to slide between the open position and the closed position, wherein the stem includes a lower buffer at a lower end of the stem and an upper buffer at an upper end of the stem, wherein each of the lower buffer and the upper buffer includes ringed arms that are stacked and spaced apart from each other along an axis of the stem, and wherein the ringed arms are configured to sealing engage an inner surface of the bonnet that defines the bonnet chamber;
    a spindle comprising external threads and operatively coupled to the stem, wherein the spindle is configured to move along the longitudinal axis of the bonnet as the spindle is rotated via the external threads about the longitudinal axis to cause the stem to slide linearly along the longitudinal axis; and
    a pivot ball positioned between and operatively coupled to the stem and the spindle, wherein the pivot ball is configured to translate linear and rotational movement of the spindle into linear movement of the stem and the plug.

2. The shut-off valve of claim 1, further comprising a cover for the bonnet chamber, wherein the cover comprises a second inner surface that defines a through hole through which the spindle extends.

3. The shut-off valve of claim 2, wherein the cover comprises internal threads extending along the second inner surface, wherein the internal threads are configured to form a threaded coupling with the external threads of the spindle, and wherein the threaded coupling causes the spindle to move along the longitudinal axis of the bonnet as the spindle is rotated about the longitudinal axis.

4. The shut-off valve of claim 2, further comprising packing housed within a counterbore of the through hole of the cover, wherein the packing is positioned radially between and sealingly engages the spindle and the second inner surface of the cover, and wherein the packing comprises a set of alternating separators and seals.

5. The shut-off valve of claim 2, further comprising a leakage sensor configured to detect a leakage of the cryogenic fluid adjacent the cover.

6. The shut-off valve of claim 1, further comprising a pressure sensor configured to detect an air pressure within the bonnet chamber of the bonnet during operation.

7. The shut-off valve of claim 1, further comprising a spindle assembly that comprises the spindle and a lower body coupled to the stem, wherein the lower body defines a ball bore hole in which the pivot ball is positioned, and wherein the spindle includes a head that extends into the ball bore hole.

8. The shut-off valve of claim 7, wherein the head of the spindle defines a bumper bore hole, wherein the spindle assembly further comprises a bumper block positioned in the bumper bore hole, and wherein the bumper block engages the pivot ball within the ball bore hole to enable the pivot ball to translate the linear and rotational movement of the spindle into the linear movement of the stem.

9. The shut-off valve of claim 7, wherein the spindle assembly further comprises an upper body that is secured to the bonnet.

10. The shut-off valve of claim 9, wherein the spindle assembly further comprises a bellows that extends between the lower body and the upper body, wherein the upper body and the bellows defines an opening into which the spindle extends to reach the lower body, and wherein the bellows is sealingly coupled to the lower body and the upper body to fluidly isolate the external threads of the spindle from the cryogenic fluid.

11. The shut-off valve of claim 10, wherein the spindle is configured to move the lower body relative to the upper body along the longitudinal axis of the bonnet, wherein the bellows is configured to flex as the lower body moves relative to the upper body.

12. The shut-off valve of claim 1, wherein the plug includes a plug buffer configured to sealingly engage the inner surface of the bonnet that defines the bonnet chamber.

13. The shut-off valve of claim 1, wherein the plug includes a plug buffer configured to sealingly engage and slide linearly along an inner surface of the bonnet that defines the bonnet chamber.

14. A shut-off valve for use with cryogenic fluid, the shut-off valve comprising:
   a valve body defining a flow path, an inlet of the flow path, an outlet of the flow path, and a valve seat located along the flow path between the inlet and the outlet;
   a bonnet coupled to the valve body and defining a bonnet chamber that extends along a longitudinal axis of the bonnet and connects to the flow path;
   a plug configured to move along the longitudinal axis of the bonnet between a closed position at which the plug sealingly engages the valve seat and an open position at which the plug is disengaged from the valve seat; and
   a stem coupled to the plug and housed within the bonnet chamber of the bonnet, wherein the stem is configured to move along the longitudinal axis of the bonnet to cause the plug to move between the open position and the closed position, wherein the stem includes one or more buffers, wherein each of the one or more buffers includes ringed arms that are stacked and spaced apart from each other along an axis of the stem.

15. The shut-off valve of claim 14, wherein the one or more buffers includes a lower buffer at a lower end of the stem and an upper buffer at an upper end of the stem.

16. The shut-off valve of claim 14, wherein the ringed arms are configured to sealingly engage an inner surface of the bonnet in extremely cold cryogenic temperatures to deter cryogenic fluid from entering the bonnet chamber.

17. The shut-off valve of claim 14, wherein the ringed arms are formed of a plastic material configured to provide insulation for the bonnet from extremely cold cryogenic temperatures of the cryogenic fluid.

18. The shut-off valve of claim 14, further comprising:
   a cover for the bonnet chamber, wherein the cover comprises an inner surface that defines a through hole; and
   packing housed within a counterbore of the cover, wherein the packing comprises a set of alternating separators and seals.

19. The shut-off valve of claim 14, wherein the plug includes a plug buffer configured to sealingly engage an inner surface of the bonnet that defines the bonnet chamber.

* * * * *